United States Patent
Woolway

(10) Patent No.: US 7,873,717 B1
(45) Date of Patent: Jan. 18, 2011

(54) PROGRESSIVE LAYERED FORENSIC CORRELATION OF COMPUTER NETWORK AND SECURITY EVENTS

(75) Inventor: Allan P. Woolway, Hillsborough, NJ (US)

(73) Assignee: International Business Machines Corporation, Armonk, NY (US)

( * ) Notice: Subject to any disclaimer, the term of this patent is extended or adjusted under 35 U.S.C. 154(b) by 1593 days.

(21) Appl. No.: 11/145,779

(22) Filed: Jun. 6, 2005

(51) Int. Cl.
G06F 15/173 (2006.01)
G06F 9/44 (2006.01)
G06F 11/00 (2006.01)

(52) U.S. Cl. .................. 709/223; 717/115; 726/23
(58) Field of Classification Search .......... 709/223; 717/115; 726/23
See application file for complete search history.

(56) References Cited

U.S. PATENT DOCUMENTS

| | | | | |
|---|---|---|---|---|
| 5,278,901 A | * | 1/1994 | Shieh et al. | 726/22 |
| 5,704,017 A | * | 12/1997 | Heckerman et al. | 706/12 |
| 6,185,689 B1 | * | 2/2001 | Todd et al. | 726/25 |
| 6,253,337 B1 | * | 6/2001 | Maloney et al. | 714/38 |
| 6,266,773 B1 | * | 7/2001 | Kisor et al. | 726/17 |
| 6,345,239 B1 | * | 2/2002 | Bowman-Amuah | 703/6 |
| 2003/0051026 A1 | * | 3/2003 | Carter et al. | 709/224 |
| 2003/0097588 A1 | * | 5/2003 | Fischman et al. | 713/200 |

\* cited by examiner

Primary Examiner—Ranodhi N Serrao
(74) Attorney, Agent, or Firm—DeLizio Gilliam, PLLC

(57) ABSTRACT

Rules are arranged as nodes among layers of a hierarchical decision tree. Nodes of the decision tree can be copied and re-used at other locations on the current tree, or on another tree, in a highly efficient manner. When this occurs, corresponding field values from a parent or ancestor node are automatically updated in the newly introduced node. In addition, when a decision tree is used to operate on an event repository, the results of various rules, defined as a "match" or "no match", are stored in a common event table that is accessible by nodes at other layers of the decision tree. In addition, actions can be initiated, for example command scripts, at designated nodes of the decision tree, for example upon the occurrence of certain conditions.

41 Claims, 23 Drawing Sheets

_154B_

| 1.1.1.1 - Any other events for original parent time and 10 minutes prior with the same |||||| 
|---|---|---|---|---|---|
| Record | Matching Event | Host/Agent | Destination IP | Source IP | Time |
| Event-1.1 | Denial of Service | Snort | 102.2.2.2 | 172.1.1.1 | 5:50 AM |
| Event-1.3 | ICMP Host Unreachable | Cisco PIX | 102.2.2.2 | 172.1.1.1 | 5:51 AM |
| Event-1.6 | Denial of Service | Snort | 102.2.2.3 | 172.1.1.1 | 5:50 AM |
| Event-1.7 | ICMP Host Unreachable | CheckPoint | 102.2.2.8 | 172.1.1.1 | 5:50 AM |
| Event-1.8 | Failed Logon | WinNMS | 102.2.2.3 | 172.1.1.1 | 5:52 AM |
| Event-1.11 | Denial of Service | IIS | 102.2.2.3 | 172.1.1.1 | 5:45 AM |

| Network/Server/Security Events - Updated with results from the action |||||| 
|---|---|---|---|---|---|
| Record | Matching Event | Host/Agent | Destination IP | Source IP | Time |
| Event-1.1 | Denial of Service | Snort | 102.2.2.2 | 172.1.1.1 | 5:50 AM |
| Event-1.2 | Large packets | Snort | 102.2.2.2 | 172.1.1.6 | 5:40 AM |
| Event-1.3 | ICMP Host Unreachable | Cisco PIX | 102.2.2.2 | 172.1.1.1 | 5:51 AM |
| Event-1.4 | CPU 100% | 102.2.2.4 | n/a | n/a | 5:58 AM |
| Event-1.5 | Disk Full | 102.2.2.4 | n/a | n/a | 5:58 AM |
| Event-1.6 | Denial of Service | Snort | 102.2.2.3 | 172.1.1.1 | 5:50 AM |
| Event-1.7 | ICMP Host Unreachable | CheckPoint | 102.2.2.8 | 172.1.1.1 | 5:50 AM |
| Event-1.8 | Failed Logon | WinNMS | 102.2.2.3 | 172.1.1.1 | 5:52 AM |
| Event-1.9 | CPU 100% | 102.2.2.9 | n/a | n/a | 5:57 AM |
| Event-1.10 | Denial of Service | IIS | 102.2.2.3 | 189.3.4.5 | 5:39 AM |
| Event-1.11 | Denial of Service | IIS | 102.2.2.3 | 172.1.1.1 | 5:45 AM |
| Event-1.12 | Ping Failed | 102.2.2.45 | n/a | 172.1.1.1 | 6:01am |

| | Field | Operator | Value | |
|---|---|---|---|---|
| Data Source: | Event_Summary_Live ▼ | | | |
| Alias: | DoS_Deny | | | |
| Description: | Denial of Service RPC Service | | | |
| ((( | Trap_Text | Contains | Denial of Service | OR |
| | Trap_Text | Contains | Denial of Service | ) AND |
| | Destination_Port | = | 135 | ) AND |
| | Source_Port | = | 7 | OR |
| | Source_Port | = | 19 | OR |
| | Source_Port | = | 135 | ) |

[ Add Row ] [ Show SQL Statement ] [ Show Query Result ]

FIG. 9B

| | Field | Operator | Value | |
|---|---|---|---|---|
| Data Source: | Event_History ▼ | | | |
| Alias: | UTILandCPU_Hi | | | |
| Description: | Utilization or CPU Usage is high (Detailed History) | | | |
| ( | Trap Description | Contains | Utilization | AND |
| | Trap Value | >= | 95 | ) OR |
| ( | Trap Description | Contains | CPU | AND |
| | Trap Value | >= | 95 | ) |

[ Add Row ] [ Show SQL Statement ] [ Show Query Result ]

FIG. 9C

SQL Statement

Select * From Event_Summary_Live
Where
(((Event_Summary_Live.Trap_Text Like '%Denial of Service%' OR
Event_Summary_Live.Trap_Text Like '%DenialofService%') AND
Event_Summary_Live.Destination_Port='135') AND Event_Summary_Live.Source_Port
='7' OR Event_Summary_Live.Source_Port='19' OR Event_Summary_Live.Source_Port
='135')

PROGRESSIVE LAYERED FORENSIC CORRELATION OF COMPUTER NETWORK AND SECURITY EVENTS

BACKGROUND OF THE INVENTION

Computer network and security devices and software have the ability to generate records of certain system operations. Such records are commonly referred to as system "events". System events are recorded by many types of systems operating on a computer network, including switches, routers, firewalls, intrinsic detection systems, servers, desktop computers, and the like. System events are typically generated when a system abnormality is encountered, but events can also be used to record normal system operations.

Contemporary applications, including security event managers (SEMs) and network event managers (NEMs), provide for event management and consolidation. An example of such a system is disclosed in U.S. patent application Ser. No. 10/455,940, filed Jun. 6, 2003, the content of which is incorporated herein by reference. In many such applications, events are stored in an event repository file. The management tool may prioritize certain events, for example by categorizing an event as a security event that requires a high level of attention. Correlation operations can be performed on the stored events in an effort to extract forensic information from the events. For example, a certain pattern of events over a specified time period may indicate an attempted system security breach. Event management applications define correlation parameters in the form of rules, which take the form of scripts, for example structured query language (SQL) scripts and regular expressions, that can be processed by the system on the event repository.

Event rule creation is typically a manual process that is performed by a trained professional. When a new rule, or group of rules, is to be added to the event management application, human interaction is necessary. This is a costly and time-consuming process that does not always produce accurate results. In addition, with the need for manual interaction, there is significant delay in event identification, classification and reaction. Rule-builder applications improve the process of formulating rules, and generating scripts. However, these applications are limited in that they still involve a high degree of human review for effectiveness.

SUMMARY OF THE INVENTION

The present invention is directed to a system and method for correlating system events in an intuitive and modular fashion. Rules are arranged as nodes among layers of a hierarchical decision tree. Nodes of the decision tree can be copied and re-used at other locations on the current tree, or on another tree, in a highly efficient manner. When this occurs, corresponding field values from a parent or ancestor node are automatically updated in the newly introduced node. In addition, when a decision tree is used to operate on an event repository, the results of various rules, defined as a "match" or "no match", are stored in a common event table that is accessible by nodes at other layers of the decision tree. In this manner, the investigation performed by the decision tree is progressive in the sense that the correlation results of nodes of higher layers of the decision tree can be utilized by correlation nodes of lower layers, allowing the information extracted by the decision tree to build progressively.

In addition, the systems and methods of the present invention allow for the initiation of actions, for example command scripts, at designated nodes of the decision tree, for example upon the occurrence of certain conditions. A node or nodes of the decision tree can be instructed to perform correlations based on the results of the initiated action. A waiting period can be introduced to ensure that the action has completed and results have been secured before further processing of the decision tree. Furthermore, each node can correlate events according to an independent time domain, or, alternatively, a node time domain can be inherited from a node on a higher layer of the decision tree hierarchy. This allows for greater flexibility in correlating events.

In this manner, an efficient and intuitive system and method are provided for building, operating and maintaining a dynamic event correlation decision tree. Reliable forensic analysis of system events is thereby made available to a broader spectrum of users, without the need for extensive training or programming capability. The investigative work of a Security or Network Specialist is therefore realized with limited human interaction.

In one aspect, the present invention is directed to a method for forensic analysis of events in an event listing. A plurality of correlation objects are arranged in a hierarchical decision tree having multiple layers, each correlation object including a correlation rule that defines a correlation that is to be performed by the correlation object, at least one of the layers having parent correlation objects to which children correlation objects are assigned. The decision tree is applied to an event listing to perform a forensic analysis in an order of correlation objects that is defined by a correlation thread, the correlation thread initiating a correlation by one of the parent correlation objects which results in one of a success or failure. In the event of a success of the parent correlation object, results of the correlation performed by the parent correlation object are stored in a parent event listing corresponding to the parent correlation object, the parent event listing comprising a subset of events of the event listing, and the correlation thread initiating a correlation by one of the child correlation objects assigned to the successful parent correlation object, the child correlation object accessing the parent event listing for performing the correlation.

In one embodiment, the events comprise at least one of network events and security-related events.

In another embodiment, the event listing comprises one of a main event listing and a summary event listing containing de-duplicated events of the main event listing.

In another embodiment, the correlation thread begins with higher-level correlation objects and continues to lower-level correlation objects.

In another embodiment, in the event of a failure of the correlation performed by the parent correlation object, the correlation thread initiates a correlation by another parent correlation object.

In another embodiment, the correlation thread initiates correlations by correlation objects on a same level of a decision tree in order of importance of the correlation objects sharing the same level.

In another embodiment; a child correlation object further accesses a parent event listing corresponding to an ancestor correlation object of the parent correlation object for performing the correlation.

In another embodiment, in the event of a failure of the correlation performed by the child correlation object, the correlation thread initiates a correlation by another sibling child correlation object that is assigned to the successful parent correlation object.

In another embodiment, in the event of a success of the child correlation object, results of the correlation performed by the child correlation object are stored in a child event listing corresponding to the child correlation object, the child event listing comprising a subset of events of the event listing, and the correlation thread initiating a correlation by descendant child correlation objects assigned to the successful child correlation object, the descendant child correlation object accessing the child event listing for performing the correlation.

In another embodiment, a success of a correlation is based on whether events match a rule query defined for a correlation object performing the correlation. In another embodiment, a success of a correlation is further based on whether fields of events of the correlation performed on the correlation object match. In another embodiment, a success of a correlation is further based on whether fields of events of the correlation performed on the correlation object do not match.

In another embodiment, a success of the correlation of the correlation object is further based on whether a value of a field of events matching the rule query match fields of events stored in an event listing of an ancestor object.

In another embodiment, the object performing the correlation generates an event as a result of one of a success or a failure of the correlation, and storing the event in the event listing for access by other correlation objects in decision trees having access to the event listing.

In another embodiment, an automation is initiated as a result of one of a success or failure of the correlation, the automation initiating an activity of the system. In another embodiment, the automation comprises performing a command script. In another embodiment, the method further comprises analyzing results produced by the command script, generating an event as a result of the analysis, and storing the event in the event listing for access by other correlation objects in the decision tree.

In another embodiment, the method further comprises initiating a pause period upon initiating the automation, the pause period pausing the system to ensure completion of the automation before the correlation thread continues.

In another embodiment, the method further comprises defining a time frame of the event listing from which events can be drawn for the correlation. In another embodiment, a time frame corresponding to the child correlation object is calculated relative to a time frame corresponding to the parent correlation object.

In another embodiment, arranging a plurality of correlation objects in a hierarchical decision tree further comprises copying a correlation object from a first location on the decision tree to a second location. In another embodiment, the correlation thread of the copied correlation object is automatically adjusted to correspond with the second position. In another embodiment, children and any other descendant correlation objects of the copied correlation object are further copied and automatically adjusted to correspond with the second position of the copied correlation object.

In another aspect, the present invention is directed to a method of assembling a decision tree for forensic analysis of events in an event listing. A plurality of correlation objects are arranged in a hierarchical decision tree having multiple layers, each correlation object including a correlation rule that defines a correlation that is to be performed by the correlation object, at least one of the layers having parent correlation objects to which children correlation objects are assigned. A correlation object is copied from a first location on the decision tree to a second location. The correlation thread of the decision tree is automatically adjusted so that the copied correlation object is automatically adjusted to correspond with the second position.

In one embodiment, copying comprises copying child and any other descendant correlation objects of the copied correlation object to depend from the copied correlation object and wherein automatically adjusting the correlation thread comprises automatically adjusting the correlation thread of the child correlation objects to correspond with the second position of the copied correlation object.

In another aspect, the present invention is directed to a system for forensic analysis of events in an event listing comprising: a plurality of correlation objects arranged in a hierarchical decision tree having multiple layers, each correlation object including a correlation rule that defines a correlation that is to be performed by the correlation object, at least one of the layers having parent correlation objects to which children correlation objects are assigned; and a system that applies the decision tree to an event listing to perform a forensic analysis in an order of correlation objects that is defined by a correlation thread, the correlation thread initiating a correlation by one of the parent correlation objects which results in one of a success or failure, and, in the event of a success of the parent correlation object, results of the correlation performed by the parent correlation object are stored in a parent event listing corresponding to the parent correlation object, the parent event listing comprising a subset of events of the event listing, and the correlation thread initiating a correlation by one of the child correlation objects assigned to the successful parent correlation object, the child correlation object accessing the parent event listing for performing the correlation.

In one embodiment, the events comprise at least one of network events and security-related events.

In another embodiment, the event listing comprises one of a main event listing and a summary event listing containing de-duplicated events of the main event listing.

In another embodiment, the correlation thread begins with higher-level correlation objects and continues to lower-level correlation objects.

In another embodiment, in the event of a failure of the correlation performed by the parent correlation object, the correlation thread initiates a correlation by another parent correlation object.

In another embodiment, the correlation thread initiates correlations by correlation objects on a same level of a decision tree in order of importance of the correlation objects sharing the same level.

In another embodiment, a child correlation object further accesses a parent event listing corresponding to an ancestor correlation object of the parent correlation object for performing the correlation.

In another embodiment, in the event of a failure of the correlation performed by the child correlation object, the correlation thread initiates a correlation by another sibling child correlation object that is assigned to the successful parent correlation object.

In another embodiment, in the event of a success of the child correlation object, results of the correlation performed by the child correlation object are stored in a child event listing corresponding to the child correlation object, the child event listing comprising a subset of events of the event listing, and the correlation thread initiating a correlation by descendant child correlation objects assigned to the successful child correlation object, the descendant child correlation object accessing the child event listing for performing the correlation.

In another embodiment, a success of a correlation is based on whether events match a rule query defined for a correlation object performing the correlation.

In another embodiment, a success of a correlation is further based on whether fields of events of the correlation performed on the correlation object match.

In another embodiment, a success of a correlation is further based on whether fields of events of the correlation performed on the correlation object do not match.

In another embodiment, a success of the correlation of the correlation object is further based on whether a value of a field of events matching the rule query match fields of events stored in an event listing of an ancestor object.

In another embodiment, the correlation object further performs the correlation generating an event as a result of one of a success or a failure of the correlation, and storing the event in the event listing for access by other correlation objects in the decision tree.

In another embodiment, an automation is initiated as a result of one of a success or failure of the correlation, the automation initiating an activity of the system. In another embodiment, the automation comprises performing a command script. In another embodiment, results produced by the command script are further analyzed, an event is generated as a result of the analysis, and the event is stored in the event listing for access by other correlation objects in decision trees having access to the event listing.

In another embodiment, a pause period is initiated upon initiating the automation, the pause period pausing the system to ensure completion of the automation before the correlation thread continues.

In another embodiment, a time frame of the event listing is defined from which events can be drawn for the correlation. In another embodiment, a time frame corresponding to the child correlation object is calculated relative to a time frame corresponding to the parent correlation object. In another embodiment, a correlation object of the decision tree can be copied from a first location on the decision tree to a second location. In another embodiment, the correlation thread of the copied correlation object is automatically adjusted to correspond with the second position.

In another embodiment, children and any other descendant correlation objects of the copied correlation object are further copied and automatically adjusted to correspond with the second position of the copied correlation object.

In another aspect, the present invention is directed to a system of assembling a decision tree for forensic analysis of events in an event listing comprising: a plurality of correlation objects arranged in a hierarchical decision tree having multiple layers, each correlation object including a correlation rule that defines a correlation that is to be performed by the correlation object, at least one of the layers having parent correlation objects to which children correlation objects are assigned; wherein a correlation object can be copied from a first location on the decision tree to a second location, and wherein a correlation thread of the decision tree is automatically adjusted so that the copied correlation object is automatically adjusted to correspond with the second position.

In one embodiment, child correlation objects and any other descendant correlation objects of the copied correlation object are likewise copied to depend from the copied correlation object and wherein automatically adjusting the correlation thread comprises automatically adjusting the correlation thread of the child correlation objects to correspond with the second position of the copied correlation object.

In another aspect, the present invention is directed to a computer-readable medium carrying at least one sequence of instructions for performing forensic analysis of events in an event listing, wherein execution of the sequence of instructions by at least one processor causes the at least one processor to perform the steps of: arranging a plurality of correlation objects in a hierarchical decision tree having multiple layers, each correlation object including a correlation rule that defines a correlation that is to be performed by the correlation object, at least one of the layers having parent correlation objects to which children correlation objects are assigned; applying the decision tree to an event listing to perform a forensic analysis in an order of correlation objects that is defined by a correlation thread, the correlation thread initiating a correlation by one of the parent correlation objects which results in one of a success or failure; and in the event of a success of the parent correlation object, results of the correlation performed by the parent correlation object are stored in a parent event listing corresponding to the parent correlation object, the parent event listing comprising a subset of events of the event listing, and the correlation thread initiating a correlation by one of the child correlation objects assigned to the successful parent correlation object, the child correlation object accessing the parent event listing for performing the correlation.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A, 4B, 4C, 4D, and 4E are charts that illustrate the contents of a main event repository and temporary event repositories generated as a result of a correlation operation that is processed by a decision tree, in accordance with the present invention.

FIGS. 9A, 9B, and 9C are screen printouts of windows including user prompts for building a rule of a node in accordance with the present invention.

DETAILED DESCRIPTION OF PREFERRED EMBODIMENTS

The systems and methods of the present invention associates event correlations with actions to establish a connection to the next layer of a decision tree for further analysis, taking into account what has already been verified as the root of this tree. In addition, the systems of methods of the present invention traverse through layers (from the root to the edge of the tree or edge to the root) of rules and policies, taking actions to simulate the human reasoning of an engineer. In addition, a test can be run automatically with variables passed from a correlation to create an actionable event based on a positive or negative result. Based on the detected occurrence of an event or correlation of events, a process can be run and evaluated, and actions taken, while, at the same time, initiating further correlations to analyze these new self-generated results.

Figure 1:
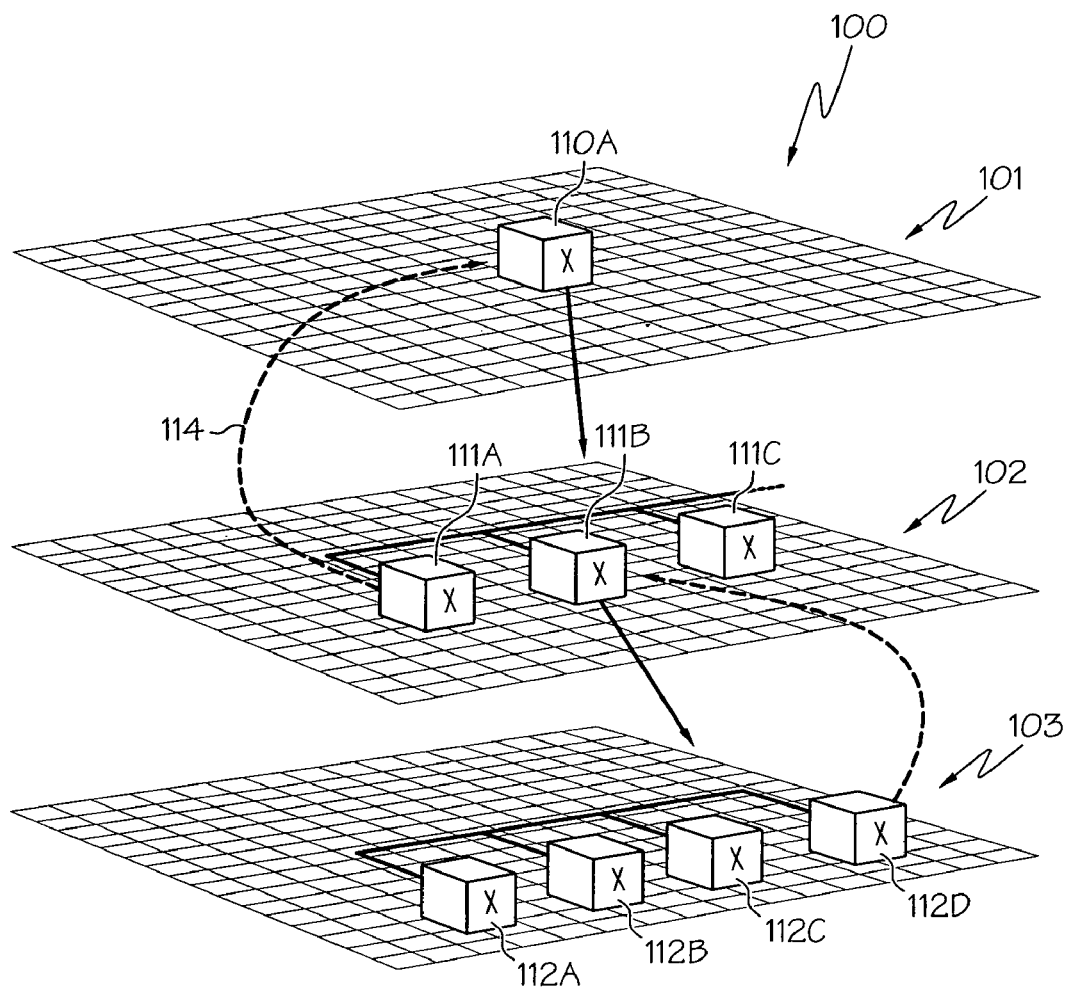
FIG. 1 is an illustration of a multiple-layered hierarchical decision tree in accordance with the present invention.

FIG. 1 is an illustration of an example of a multiple-layered hierarchical decision tree in accordance with the present invention. A multiple-layered hierarchical decision tree 100 includes a plurality of nodes, or objects, 110, 111, 112 arranged in a hierarchical configuration among multiple layers 101, 102, 103. A root layer 101 of the decision tree 100 includes a root node 110A. A second layer 102 includes multiple second-layer nodes 111A, 111B, 111C, . . . that are children nodes to the root node 110A. A third layer 103 includes multiple third layer nodes 112A, 112B, 112C, 112D that are children to the second node 111B of the second layer 102 nodes. Each node 110, 111, 112 of the decision tree contains certain parameters that define the node. In one example, these parameters include a node rule, node time frame criteria, node action criteria, and node relationship criteria. A node rule includes definitions related to the correlation of events, for example defining events that match the rule criteria. Node time frame criteria define how far back in time the associated correlation will search for events in an event repository or temporary event repository. Node automation criteria define what actions are taken based on the result of the correlation. Node relationship criteria define matching field values from a previously processed correlation for example by accessing a temporary event repository generated as a result of a previously processed node correlation or by accessing a main event repository.

Each object 110, 111, 112 includes a correlation rule which, when processed, results in a "match" or "no match" result which respectively indicates whether the correlation was successful or unsuccessful. For example, if the correlation criteria defined in the rule are met, a "match" results and if the correlation criteria are not met, a "no match" outcome is the result. Each decision tree 100 has a specific thread which defines the order in which the nodes of the decision tree are processed. In general the thread processes nodes of a higher layer of a particular branch prior to nodes of a lower layer. Also, within a given layer, nodes are processed in descending order of importance.

In the example of FIG. 1, the root node 110A on the root layer 101 is first processed, for example accessing the events of the main event repository for the system. The "X" mark in the box of node 110A indicates that the process flow of the decision tree has already passed through the node 110A. Assuming that a match resulted from the correlation performed at node 110A, process flow continues to the child nodes at a layer of the decision tree below the node 110A. For example, nodes 111A, 111B, and 111C are defined as children nodes of parent node 110A. The children nodes 111A, 111B, and 111C are positioned along the second layer 102 of the decision tree 100, and are arranged in descending order of importance. This means that the thread of the decision tree propagates initially from parent node 110A to the first child node 111A. The child node 111A processes its defined correlation parameters, for example by accessing the main event repository, or alternatively, by accessing a temporary event repository generated by the parent node 110A as a result of the correlation performed by node 110A. This access of the temporary event repository of node 110A is illustrated in FIG. 1 by dashed line 114. Assuming that the correlation performed by node 111A of the second layer results in a "no match", the thread propagates next to the next-most-important child node 111B.

At node 111B, a correlation is performed according to the defined rule parameters, and the correlation results in a "match". A temporary event repository for node 111B is generated as a result of the correlation, and the thread of the decision tree propagates from node 111B to the first child node 112A of node 111B of the children nodes 112A, 112B, 112C, 112D of the third layer 103 of the decision tree, which are children to node 111B. A correlation is performed at node 112A according to the defined rule parameters and the correlation results in a "no match" result. From there, the decision tree thread propagates to node 112B where "no match" results and then to node 112C where "no match" results. Next, child node 112D further results in a "no match". In this example, the parameters of node 111B are set such that if no match is achieved by any of the children nodes 112A-112D of the third layer 103, then the thread of the decision tree reverts back to node 111B where further operations or actions can be taken. In this manner, a given node can take action in a first case where the correlation, performed by that node results in a "match" being generated, or, alternatively, when correlations performed by all children nodes resulting a "no match".

Any or all of children nodes 112A-112D of the third layer 103 can access the main event repository or temporary event repositories generated by ancestor nodes 110A or 111B. In addition, any of the nodes at any layer of the decision tree can, in response to either a match or no-match correlation result, be configured to run a command script from an automation, or to create a new event for the main event repository or any of the temporary repositories for other nodes to access based on the evaluation of results. These features will be described in further detail below.

Although the illustration depicted in FIG. 1 includes a three-layer decision tree 100, with three sibling nodes on the second layer 102 as children to parent node 110A, and with four sibling nodes on the third layer as children to parent node 111B, the present invention is applicable to decision trees including nodes that are arranged in many different configurations that are adaptable to the task at hand. For example, each sibling node 111A, 11B, 11C may include multiple child nodes, each child node in turn having multiple child nodes of their own, etc. Such a decision tree can extend for multiple, limitless, layers, and each layer of sibling children can extend to include a limitless number of siblings, in accordance with the requirements of a given correlation.

Figure 2:
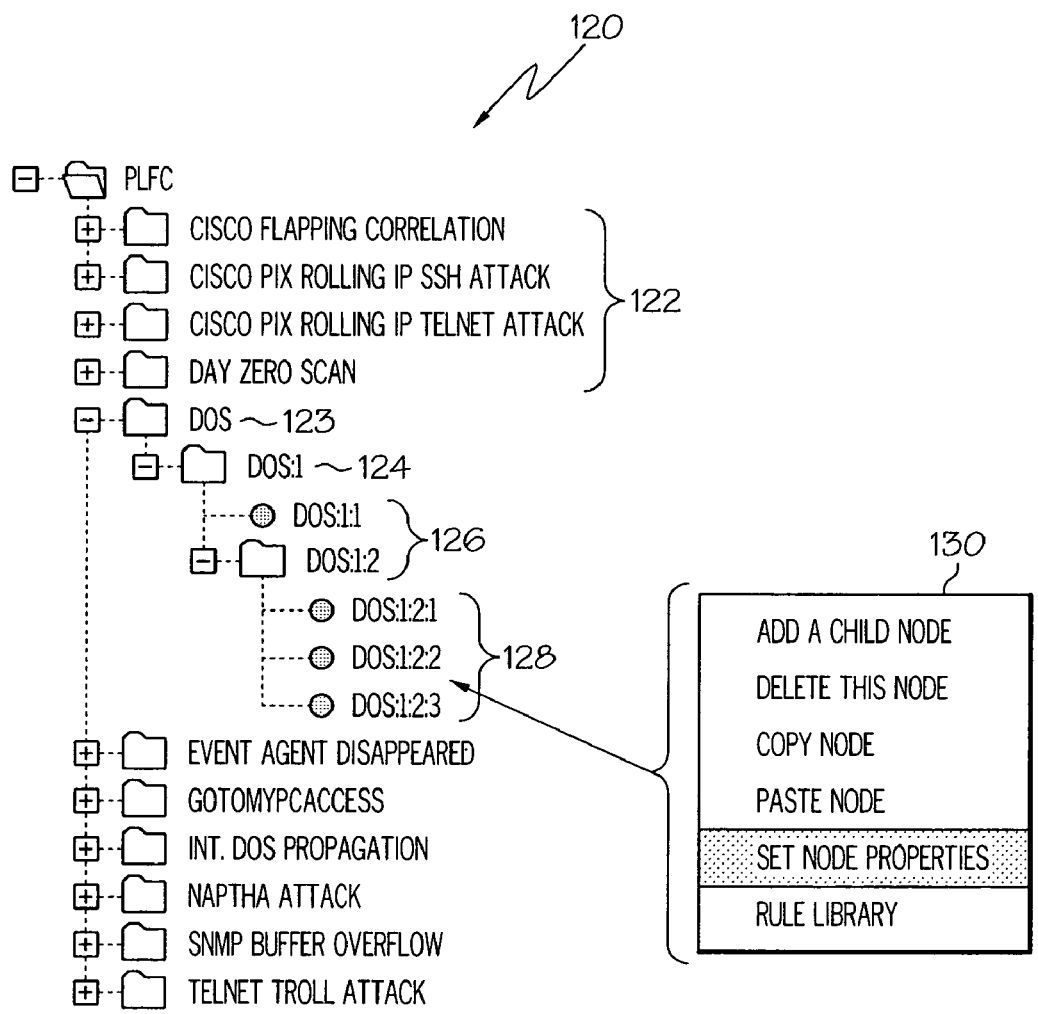
FIG. 2 is a screen printout of a decision tree menu in accordance with the present invention.

FIG. 2 is a screen printout of a decision tree menu in accordance with the present invention. A decision tree menu 120 includes a listing of a plurality of decision trees which can optionally be selected and/or configured by a user. Each decision tree 122 defines a correlation that is performed by the plurality of associated hierarchical object nodes. In the example of FIG. 2, one of the decision trees 123 relates to a denial of service (DoS) correlation. The decision tree menu 120 is arranged in a hierarchical menu format that corresponds to the hierarchical format of the decision tree. In this example, the root node of the DoS correlation 124 is represented as DoS:1. Children nodes to root node DoS:1 at the second layer 126 of the DoS correlation are represented as DoS:1:1 and DoS:1:2. Children nodes 128 of the DoS:1:2 node at a third layer of the correlation are represented as DoS:1:2:1, DoS:1:2:2, and DoS:1:2:3. For a given correlation, the number of layers and the number of sibling nodes within a layer are both limitless. In this example, numeric sequencing is used, with each layer being represented as an additional number appended to the end of the list of numbers, while sibling nodes within a layer are represented by an increasing numeric sequence within a layer.

Adding to the intuitive nature of the systems and method of the present invention, when viewing a decision tree menu 120 a user can right-click, in accordance with Microsoft Windows™ convention, on any of the nodes of the decision tree to select a node and to produce a pop-up menu 130 which allows for an operation to be performed on a given selected node. For example, in the pop-up window 130, a child node can be added to the highlighted node. Alternatively, the highlighted node can be deleted. In addition, the highlighted node can be copied or pasted to other nodes on the same decision tree 123 or nodes on other decision trees 122 of the decision tree menu 120. Alternatively, the highlighted node can be repositioned within a given layer of a branch in order to increase or decrease its relative importance. In this manner, decision tree logic developed with regard to a particular thread or logic flow can be readily applied to other locations of the decision tree. In addition, the pop-up menu 130 allows a user to define node properties with regard to a highlighted node, or to access a rule library for rules that can be applied to the highlighted node (or any other node).

Figure 3A:
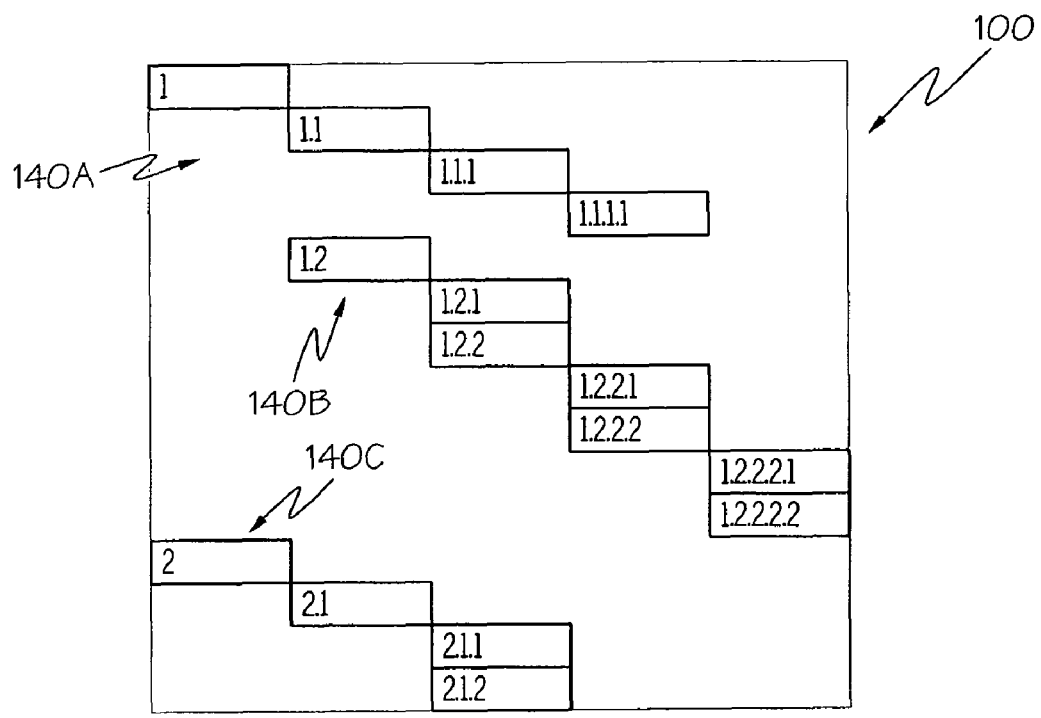
FIGS. 3A, 3B, and 3C illustrate the process of copying of a node and children branches from a first branch to a second branch of the decision tree in accordance with the present invention.
Figure 3B:
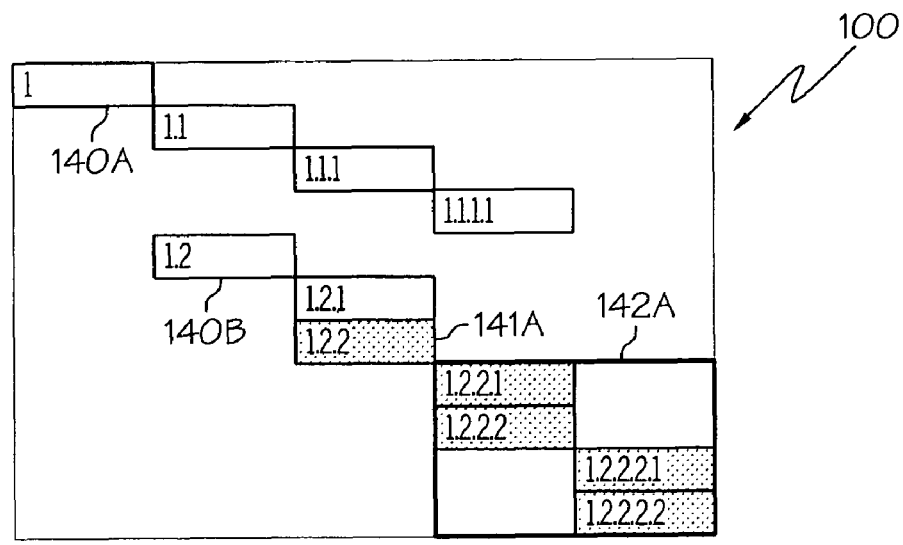
Figure 3C:
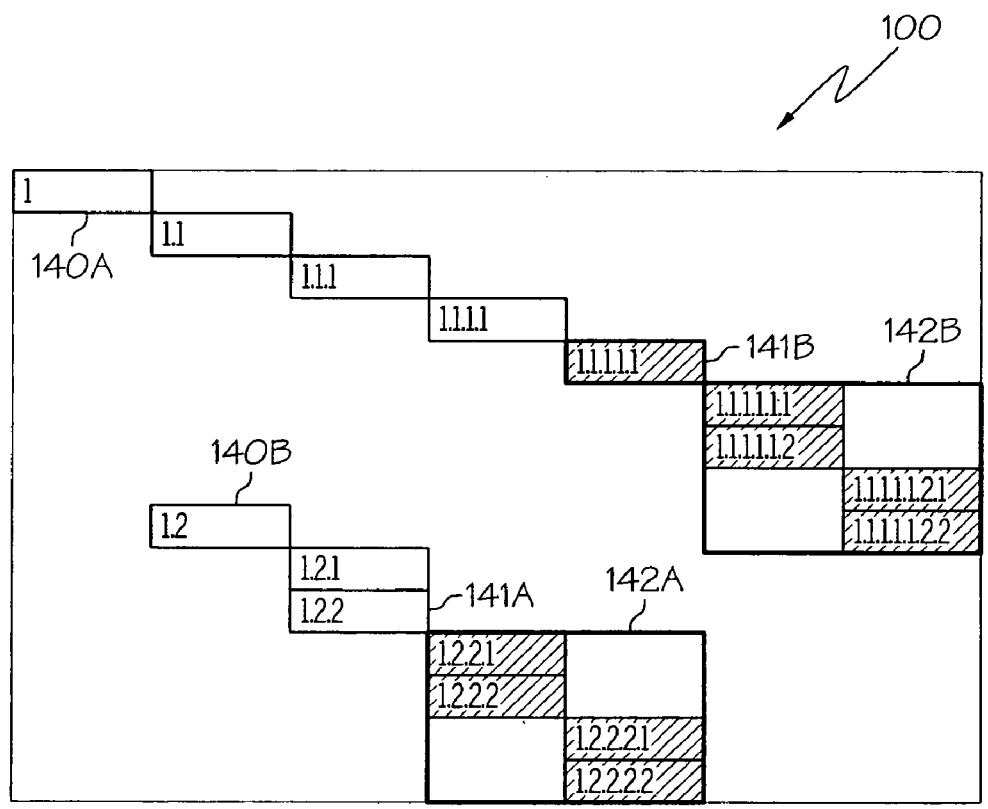

FIGS. 3A, 3B, and 3C illustrate the process of copying of a node and children branches from a first branch to a second branch of the decision tree in accordance with the present invention. With reference to FIG. 3A, a first branch of a decision tree 140A, 140B and a second branch of a decision tree 140C are illustrated. The first branch includes a first child branch 140A and a second child branch 140B. The second child branch 140B includes multiple sets of children nodes. In this example, a user desires to copy the correlation parameters of node 1.2.2 and all of its descendent children and grandchildren nodes, and to use that logic as a child to node 1.1.1.1 of the first branch 140A of the decision tree. At the decision tree menu 120, for example of the type shown in FIG. 2, the user highlights node 1.2.2 and right-clicks on the highlighted node and selects the option "copy." All of the children nodes 142A to node 141A are selected automatically, as shown in FIG. 3B.

With reference to FIG. 3C, by right-clicking on node 1.1.1.1 all of the nodes that are related to the 1.2.2 segment of the decision tree are then pasted onto the first branch 140A as children of the 1.1.1.1 node. All relationships are automatically adjusted to the new location.

In one embodiment of the systems and methods of the present invention, the relationships between nodes are retained in a table with the node identifier sequencing being the primary referencing key. Other tables contain information relating to each node as well. These tables contain, for example a temporary event repository (see for example the temporary event repository 154A for node 1.1.1 illustrated and described with reference to FIG. 4B, below). When a series of nodes are added to a new tree, each node is checked to ensure that if a field is referenced to an ancestor, that the node relationship can either be adjusted or deleted, for example, by adjusting the node identifier sequencing. For example, if a node is configured to perform a match on the field Source IP in node 1.1.1.2 to a parent field of Source IP in node 1.1.1, then if the node were copied and pasted to a new branch at node 2.5.4 (creating the new node 2.5.4.1), the "As Node" property in 2.5.4.1 (see field 288B of FIGS. 13-16, discussed below, would be changed to compare to the Source IP of node 2.5.4. If, in the same example, node 1.1.1 was configured to capture events within the previous 8 minutes (the concept of timeframe matching is discussed in further detail below), and node 1.1.1.2 as configured to refer to the parent timeframe, its timeframe would then be 8 minutes as well. After being copied, new node 2.5.4.1 would refer to the new parent time which, in this case, would be whatever time period node 2.5.4 had been configured for.

The manner in which this is accomplished is by allowing the system to always know the number of layers above the present layer that were to be reviewed, whether the field to match would have a value based on a successful match. Knowing how many levels can be handled by the node identifier numbering sequence, for example, node 1.1.1 would be two levels above node 1.1.1.1.2. If, in the case above 1.1.1.1 is copied to 2.5.4, then 1.1.1.1.2 would automatically become 2.5.4.1.2 and two levels above would be 2.5.4.

The ability to reuse and copy objects between portions of the same decision tree and between independent decision trees enables the efficient building of a complete forensic analysis by a wide range of users. This is significant feature provided by the systems and methods of the present invention.

Figure 4A:
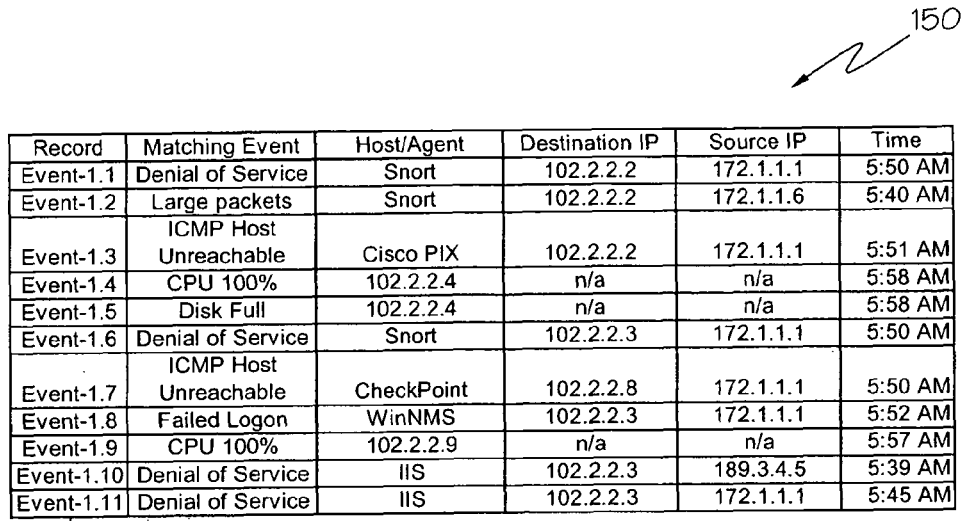

FIGS. 4A, 4B, 4C, 4D, and 4E are charts that illustrate the contents of a main event repository and temporary event repositories generated as a result of a decision-tree based correlation operation, in accordance with the present invention. With reference to FIG. 4A, a main event repository table 150 is shown, including eleven event records, each in a specified event format for the given operating system. In this example, each event record includes a description of the event, the host or agent generating the event, the Destination IP address, the Source IP address, and the time the event was generated.

Figure 4B:
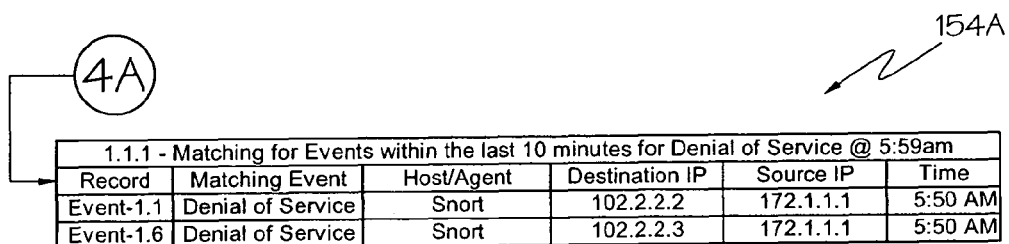
Figure 4C:
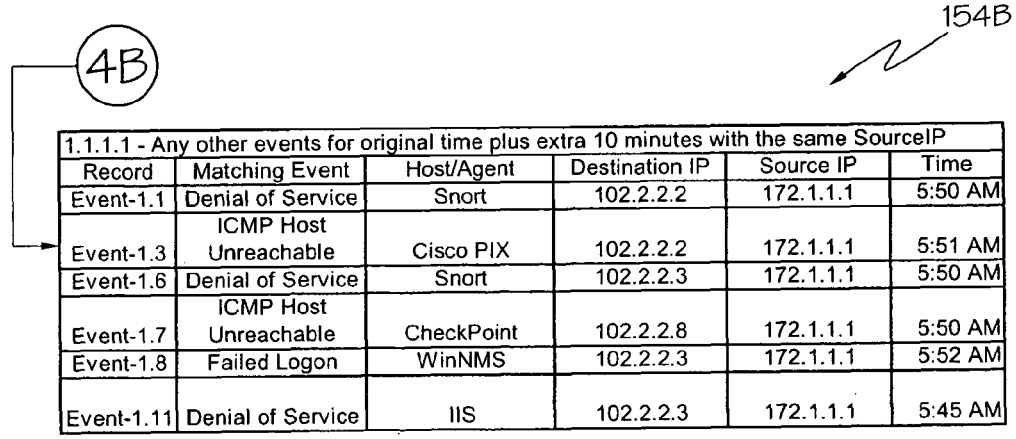

With reference to FIG. 4B, table 154A illustrates a temporary repository generated by node 1.1.1 in the decision tree. The rule criteria for node 1.1.1 in this example are any Denial of Service events that have been generated within the previous ten minutes, assuming that the time the correlation was run was 5:59 am.

Since object 1.1.1 resulted in a match, the thread of this example proceeds to child object 1.1.1.1. The rule of object 1.1.1.1 correlates for a match for any events stored in the event repository having a source IP that matches the Source IP of any Denial of Service events found as a result of the rule of parent node 1.1.1, for any events occurring in the original parent-node time span of ten minutes plus an additional ten minutes. The events matching this correlation criteria are stored in table 154B. In this manner, events having a specific Source IP, in this example a Source IP of 172.1.1.1, have been uncovered based on the generation of a specific event, in this example Denial of Service. In addition, the time span of the correlation performed by the child node is an extension of the time span of the parent node, in this example, ten minutes beyond the present time span of ten minutes, or twenty minutes.

FIG. 4D is a reproduction of the temporary repository table 154B generated for node 1.1.1.1. Node 1.1.1.1 is further configured to produce an action based on the events recorded in the temporary repository for node 1.1.1.1. In this case, the Source IP of the events stored in temporary repository for node 1.1.1.1, 154B is pinged; in other words, an action is generated to ping Source IP 172.1.1.1. As a result of the initiation of the ping of the Source IP, a new event 152, namely event 1.12 is generated in the main event repository 150, as shown in FIG. 4E. Event 1.12 152 indicates that the ping of Source IP 172.1.1.1 failed, information which might indicate that Source IP is not a valid IP but is rather spoofed. This information can be used by other decision trees, or other portions of the same decision tree, to achieve a certain result. This illustrates that in one embodiment of the systems and methods of the present invention, a node can include an automation or action, for example, by generating a command script that is performed on the system. The results of the command script can be automatically analyzed, and an event can be generated in a main event table, or other summary event table that is accessible by other nodes of the present branch of the decision tree, or by entirely different branches of the decision tree, or by other correlations.

Figure 5:
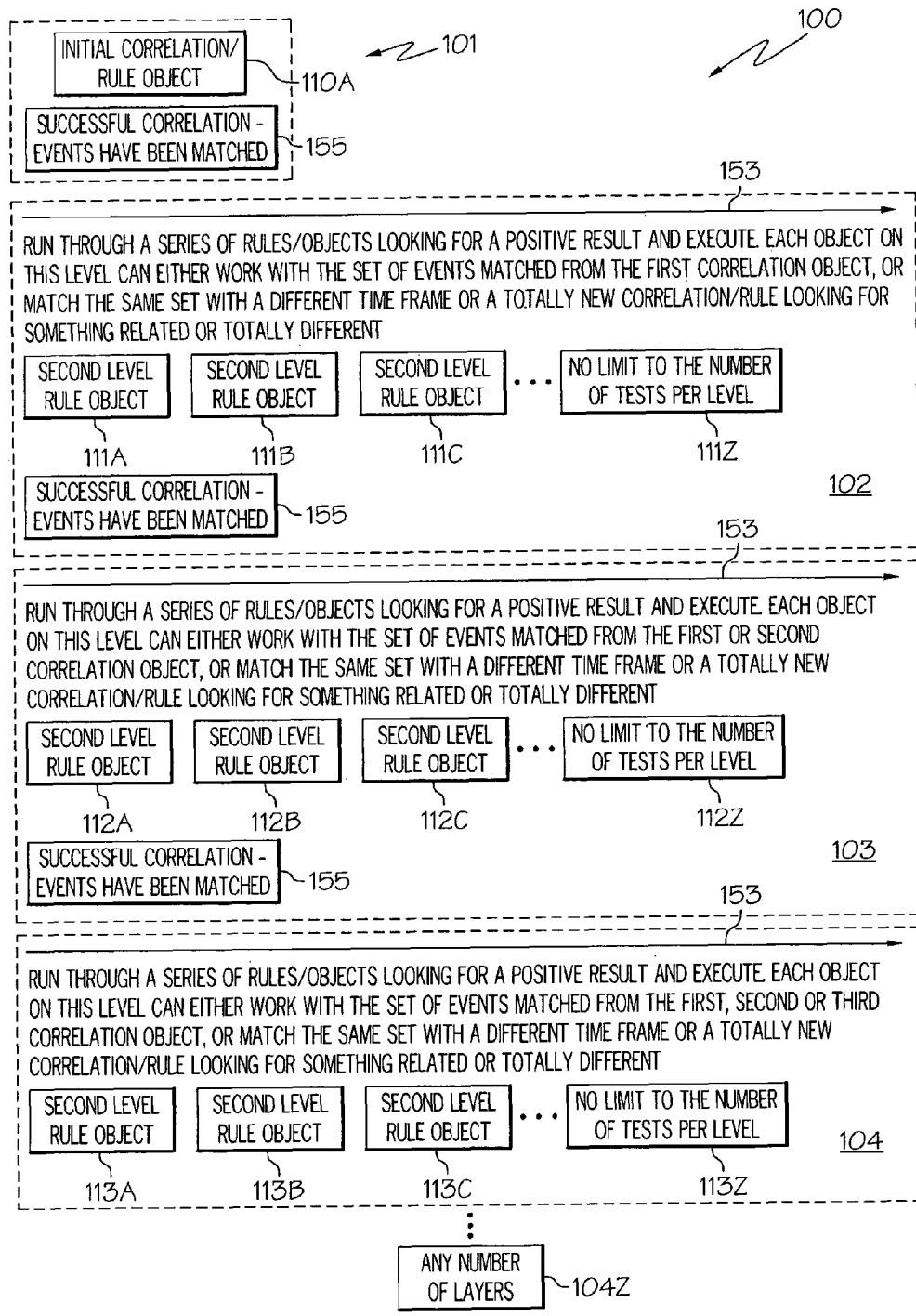
FIG. 5 is another illustration of a decision tree and the related progressive system flow, in accordance with the present invention.

FIG. 5 is another illustration of a decision tree and the related progressive system flow, in accordance with the present invention. In this illustration, four node layers are included in the decision tree 100. Root layer 101 includes root node 110A. A second layer 102 includes nodes 111A, 111B, 111C, . . . 111Z which are children nodes to root node 110A of the root layer 101. A third layer 103 includes nodes 112A, 112B, 112C, . . . 112Z which are children nodes to root node 111A of the second layer 102. A fourth layer 104 includes nodes 113A, 113B, 113C, . . . 113Z which are children nodes to root node 112A of the third layer 103. The sibling nodes of a given layer are accessed in a descending order of importance indicated by arrow 153. In this example, the nodes of a lower layer are accessed upon a successful correlation by the parent node, meaning that events have been matched to the correlation. This is shown at each layer as box 155. Assuming that events have been matched to the correlation performed at the root node 110A, the thread propagates to the children nodes 111A-111Z of the root node 110A, and the correlations are performed in descending order of importance. Each node 111A-111Z may in turn have one or more child nodes assigned to it, for example the sibling nodes 112A-112Z of the third layer 103 are assigned to the first node 111A of the second layer 102. Similar child nodes may be assigned to nodes 111B, 111C or other nodes of the second layer 102. In this example, upon a successful correlation of a parent node, for example node 111A, the thread propagates to a lower layer, for example the third layer 103 and the child nodes 112A-112Z assigned to parent node 111A are accessed and the correlation performed. In this manner, a decision tree 100 can be configured to perform a complex and sophisticated correlation process involving an unlimited number of layers 104Z and an unlimited number of nodes per layer 111Z, 112Z, 113Z.

Figure 6:
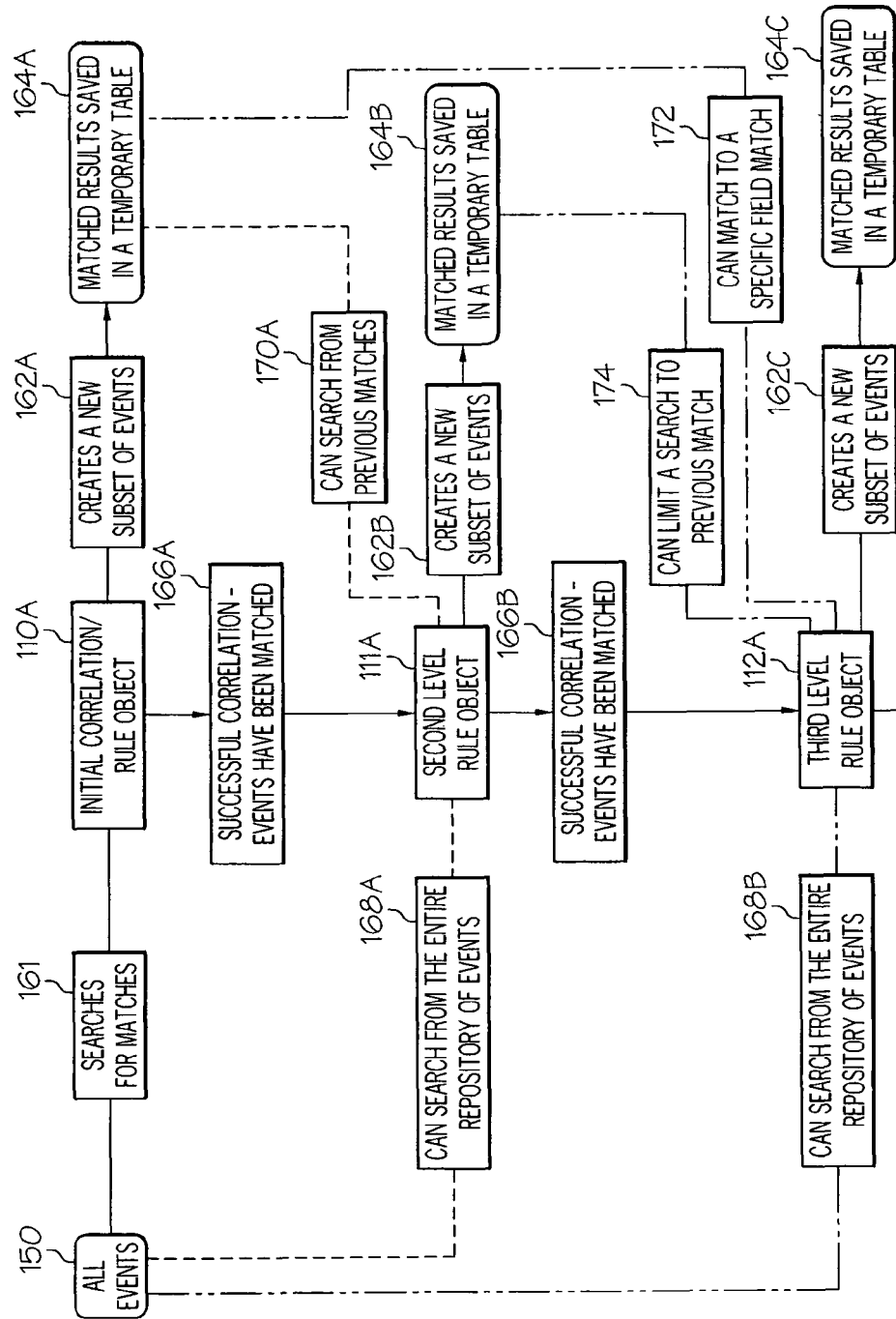
FIG. 6 is a flow diagram illustrating the access of the main event repository and various temporary event repositories by lower-layer nodes of a decision tree, in accordance with the present invention.

FIG. 6 is a flow diagram illustrating the access of the main event repository and various temporary event repositories by lower-layer nodes of a decision tree, in accordance with the present invention. In this example, a root node 110A, a child second layer node 111A and a grandchild node 112A are arranged among first, second and third layers respectively of a decision tree. The root node 110A is configured to search for matches 161 of events that are stored in the event repository 150. Assuming that the correlation was successful and that certain events have been matched according to the rule 166A, a new subset of events is created 162A and stored in a temporary event repository 164A that is associated with the root node 110A. Based on the successful correlation 166A of the root node 110A, the thread propagates to child node 111A at the second layer. At the child node 111A, a correlation is performed. The correlation of events can be performed once again in view of the main event repository 150 that includes the entire repository of events 168A and optionally can be performed 170A on the recently generated temporary repository 164A associated with the root node 110A. Assuming that a successful correlation has taken place 166B at node 111A, a new subset of events is generated 162B and the results are stored in a temporary repository 164B associated with the child node 111A of the second layer. Arising from the successful correlation 166B, the thread of the decision tree propagates to grandchild node 112A where another correlation takes place. Once again, the correlation that occurs at grandchild node 112A can access the main repository of events 168B. In addition, the correlation performed by the grandchild node 112A can access the results of a match of the correlation 174 performed by parent node 111A stored in the temporary repository 164B, or optionally can access the results of the correlation 172 performed by grandparent node 110A stored in the temporary repository 164A. In this manner, the correlation performed by a lower-layer node can access the results stored in the temporary repositories associated with ancestor nodes at any higher layer of the thread of the decision tree. As shown by arrow 173, the ability to access higher-layer results of ancestral correlations can be provided over a theoretically limitless number of layers.

Figure 7:
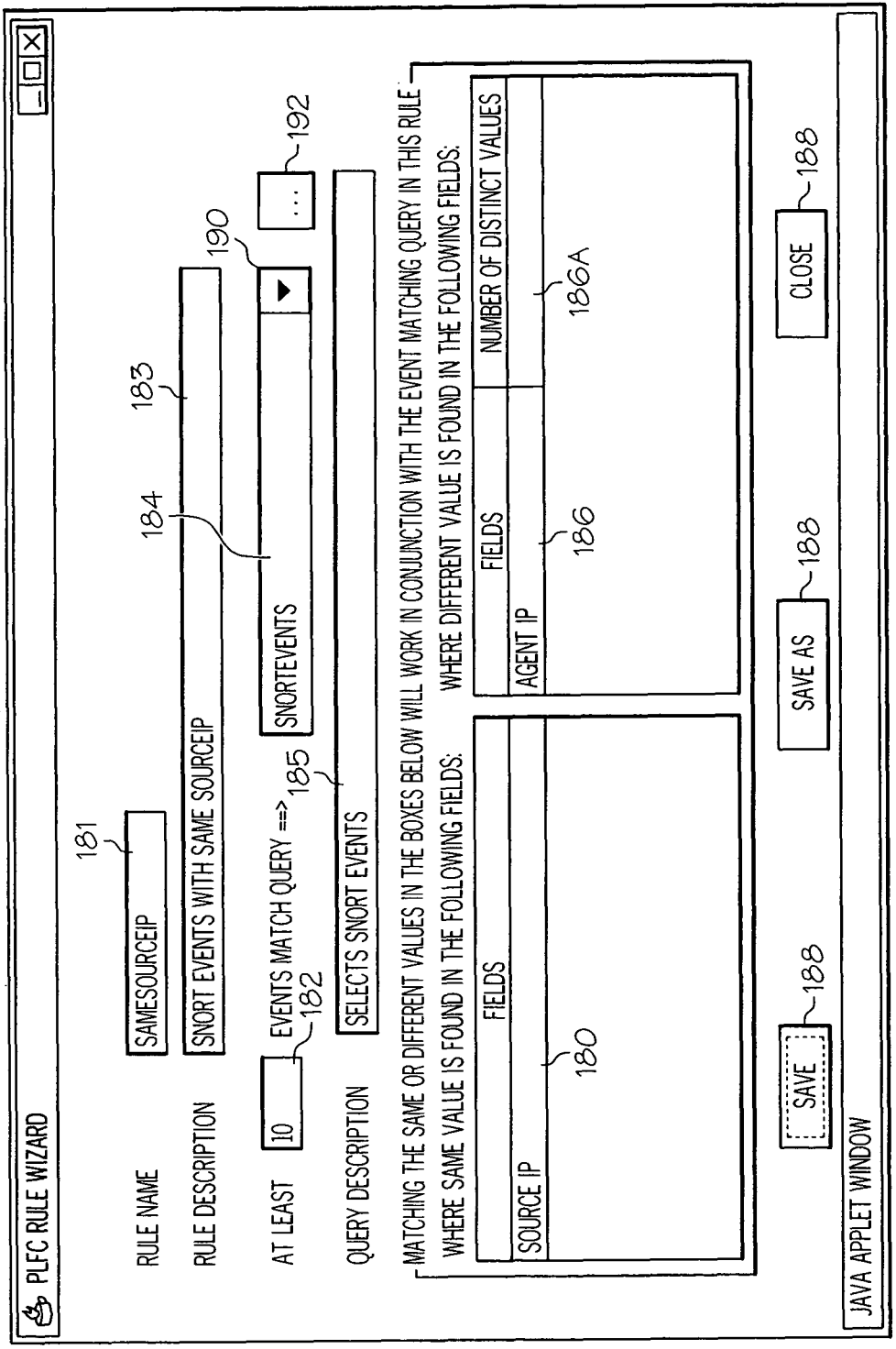
FIG. 7 is a screen printout of a rule definition entry window in accordance with the present invention.

FIG. 7 is a screen printout of a rule definition entry window in accordance with the present invention. In this window, a rule name is designated 181 and a rule description 183 can be entered. N-criteria entry field 182 designates the number of events that need to match a specified query for the correlation to generate a positive result. Entry field 184 designates a query that must be met for a match to occur. A query 184 takes the form of a predefined rule which can be generated by an automated query builder. An example of a query builder is provided below in connection with FIGS. 9A-9C. Pull-down menu 190 permits a user to select from a library of pre-stored queries available to the user. A query description window 185 contains a predefined brief description of the selected query 184. Selection box 192 permits a user to edit a selected query or to create a new one or to search for additional queries in another user directory.

Entry field 180 permits a user to further define the rule to be associated with a given node to require that certain fields of the matching events have the "same value". In this example, the Source IP field is selected such that the rule requires that in addition to ten events being of the type "snort events", the Source IP of those events must be the same. By defining the rule this way, events with the same Source IP will be grouped automatically by the rule without having to know in advance what the actual Source IP address might be when the correlation is created. Additional fields may be chosen for the same value field criteria 180. For example Source IP and Destination IP may be chosen, which would require that the events that match the query selected in entry field 184 further have the same Source IP and Destination IP for the correlation to result in a positive outcome.

Entry field 186 identifies different value field criteria which places further filtering on the correlation that requires that certain fields have different values. In this example, if Source IP is entered in the same value field and Destination IP is entered under different value fields then the correlation will search for events with records that have the same Source IP where the Destination IP is different. If, for example, the correlation rule finds three sets of Source IP groups that match all with different Destination IP values, the node correlation will handle each as a separate thread for evaluation. The correlation operation handles each group individually then proceeds to the next layer in the decision tree. Specifying the number of distinct values at field 186A limits the number of matching sets that will be found.

In another example assume that thirty events are generated by IDS units, ten of which have Source IP address 192.168.1.1, seven of which have an Agent IP address 192.168.1.2 and thirteen of which have the same Source IP address 192.168.1.3. It may be of interest to form three groups, one having Source IP=192.168.1.1, another having Source IP=192.168.1.2, and another having Source IP=192.168.1.3. In this situation it is beneficial to specify the same value fields. For this example Source IP can be defined as the same value field and multiple same value fields like Source IP and Destination IP can optionally be chosen. In this case, groups will be formed based on finding the same values in both of these fields.

Assuming three groups of events which meet the criteria of the query of field 184 and the same value field 180, it may be interesting to determine whether events that have a Source IP=192.168.1.1 are being generated by a single IDS (Agent IP=192.168.1.45, for example). However, events which have Source IP=192.168.1.2 may have a certain diversity, for example three events coming from Agent IP 192.168.1.45, two of them coming from Agent IP=192.168.1.69 (a second IDS) and two of them coming from Agent IP=192.168.1.81 (a third IDS). This is a situation where it may be advantageous to scan for diversity in certain fields in the groups of events. For example, it may be beneficial to select a group of events which are meeting both the query and the same value field criteria and also have "at least three different values in the Agent IP field" to meet the diversity criteria. Choosing the Agent IP field in the diversity criteria section and specifying that the event group must have at least three different values in the Agent IP field would establish this requirement. Assume that both the second group and third group meet the diversity criteria. Thus far, the primary result has been reduced into only two groups of events which have Source IP 192.168.1.2 and 192.168.1.3. Thus, two extremely narrow groups are generated, which is highly desirable for identifying a problematic Source IP address. The N-Criteria field 182 can then be further applied to further reduce the number of groups. In this example two groups have been assembled—a first having seven qualifying events and the other having thirteen qualifying events. In this situation it may be desirable to filter out those groups having only a few spurious occurrences. In this manner, the N-Criteria field 182 can be employed to eliminate unwanted groups. For example if the N-Criteria field 184 were set to ten, then the second group is automatically eliminated because it consists of seven events. In this example the only group that is qualified at this node is the third, so this group constitutes the events that match the criteria defined in the correlation rule of this node and are therefore stored in the associated temporary repository for the node.

The "save", "save as", and "close" options allow for a user to save the defined rule under a pre-existing name, save the defined rule under a new name, or close the rule without saving, in accordance with customary Window applications.

Figure 8:
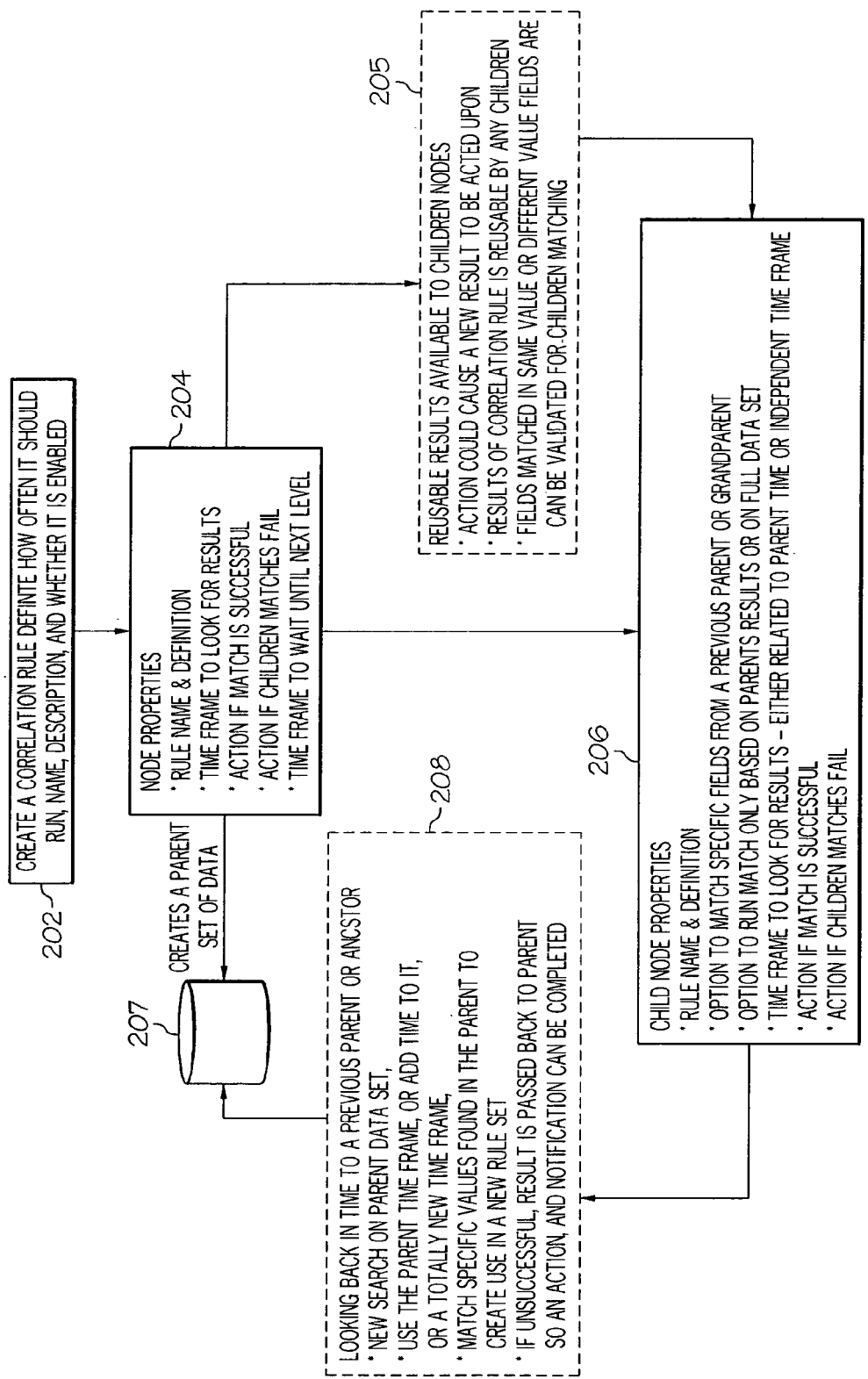
FIG. 8 is a flow diagram illustrating the integration of a rule into a node and the node's relation to a child node in accordance with the present invention.

FIG. 8 is a flow diagram illustrating the integration of a rule into a node and the node's relation to a child node in accordance with the present invention. In this illustration, correlation rule criteria are created and defined 202 for the node. A node object 204 incorporates the rule name and definition. As described above, the node 204 further contains time frame criteria which define how far back in time to go in the event listing to search for events that match the rule criteria. Also defined in the node 204 are actions to be taken if a correlation is successful under the rule and time criteria. Further, defined in the node are actions to be taken if child nodes assigned to the present node have unsuccessful correlations. The node further includes a user-defined time frame to wait before the thread propagates to a child node for example in order to permit an action to be fully carried out prior to the child node performing its correlation. As described above in conjunction with FIGS. 4A-4E, as a result of the correlation being performed at node 204 leading to a successful result, a temporary event repository 207 is generated that is associated with the node 204. The results stored in the temporary repository 207 are reusable by any child, grandchild, or other successor node to the parent node 204. In addition, an action that is generated by the parent node 204 can cause a new result, for example in the form of an event stored in the main event repository, to be acted upon by the child node. In addition, fields matched in the same value or different value fields can be validated for children matching.

When comparing related field values with those of a previous node, the ancestor node under the "Edit Rule" fields to match for same value or different value (see fields 180 and 186 of FIG. 7, above) would need to have been defined. This provides that a specific field (or fields) must have the same value for "x" number of records matched, or a stated field (or fields) must have different values. There is no limit to the number of fields being matched. Therefore, a child node can match related fields in the current node to any stated in the ancestor node based on Same or Different value fields 180, 186 defined in the "Edit Rule" screen. This is a flexible feature because the field value itself does not need to be known prior to the performing the node's correlation, or prior to performing the child node's correlation that is comparing to the results of the parent correlation. The matching process is thereby automated.

With reference to block 206 of FIG. 8, a child node also includes a rule name and definition. The correlation can be performed on specific fields of the results obtained by a parent, grandparent, or other ancestor node, or optionally based solely on the results of the direct parent node or on the main event repository. A time frame can be set that is either related to the parent time frame of the parent node 204 or an independent time frame that is unrelated to the parent time frame. In addition, like the parent node 204, the child node can be configured to take action if the correlation performed by the child node is successful, or alternatively an action can be taken if the correlations performed by further descendant nodes to the child node 206 result in a failure. With reference to block 208, a child node 206 can perform a new search that is based on the results of the correlation performed by the parent. In addition, the child node may perform its correlation based on a time frame defined at the parent node 204, or optionally a child node may designate that additional time be added to the parent time frame, or optionally an entirely new time frame may be designated for performing the child node correlation. In addition, the child node may perform its correlation by matching specific values found in the parent to create and use in a new rule set. Further, assuming a correlation performed by a child node is unsuccessful, a result can be passed back to the parent so an action and notification can be completed. During process flow, each layer is tracked for the success or failure of the respective nodes on that layer. If each node on a child layer fails, then process flow reverts back to the most previous successful correlation handled in the higher layer, which would be the parent node. This matching node is retained as a memory variable within the system. In the case of all children on a lower layer failing, the "If No Child Matches" Actions and Automations configuration field of the parent is initiated, knowing that all children nodes resulted in a correlation failure.

FIGS. 9A, 9B, and 9C are screen printouts of windows including user prompts for building a rule of a node in accordance with the present invention. In FIG. 9A, an alias or name is defined for the rule at entry field 222. A description of the rule is provided in entry field 224. Entry field 220 permits a user to select a data repository on which the rule will be operated. The data repository may comprise, for example the main event repository, or alternatively, a temporary repository for a parent, grandparent, or other ancestral node in the decision tree. Entry window 220 includes a pull-down menu to allow a user to select pre-defined repositories. Rule elements 225 are defined for the rule including a field 226, operator 228, value 230, and logical operator 232. All fields in the rule elements window are pull-down fields that allow a user to select pre-defined values for the field. The example of FIG. 9A is related to a Denial of Service rule that is reviewing the event_summary_live data repository according to the defined elements. Similarly, the example of FIG. 9B is related to a rule that determines whether events indicate that utilization or CPU usage is high, based on events contained in data source event history according to rule elements 225. Buttons at the bottom of the rule builder window allow a user to add an additional row 234 to the rule elements window, to review an SQL statement 236 corresponding to the defined rule, or to display a query result 238 by performing the rule on the designated data source. FIG. 9C illustrates an SQL statement that is generated by the rule configured in FIG. 9A.

Figure 10A:
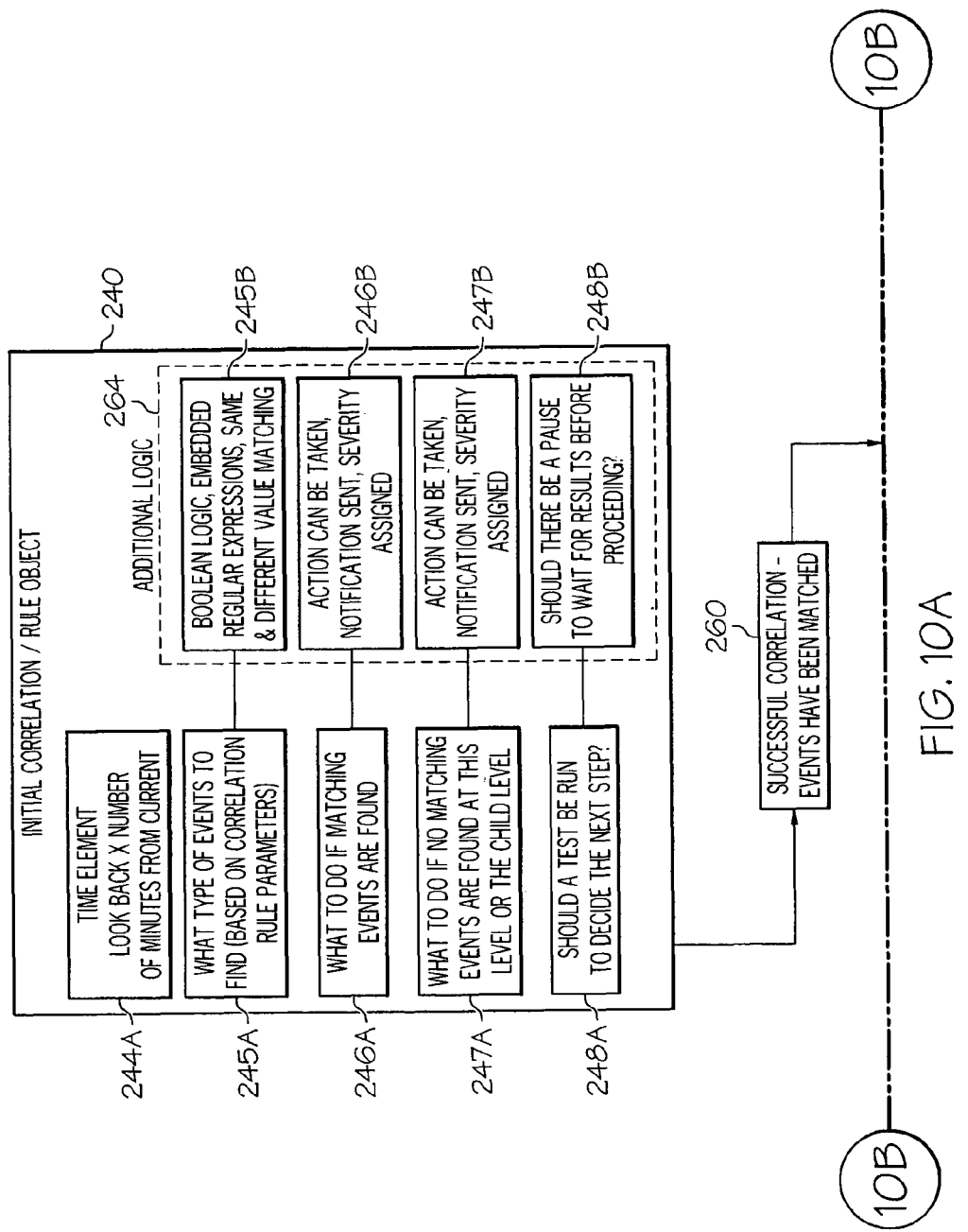
FIG. 10 is a flow diagram illustrating the components of a node including a rule and an action in accordance with the present invention.
Figure 10B:
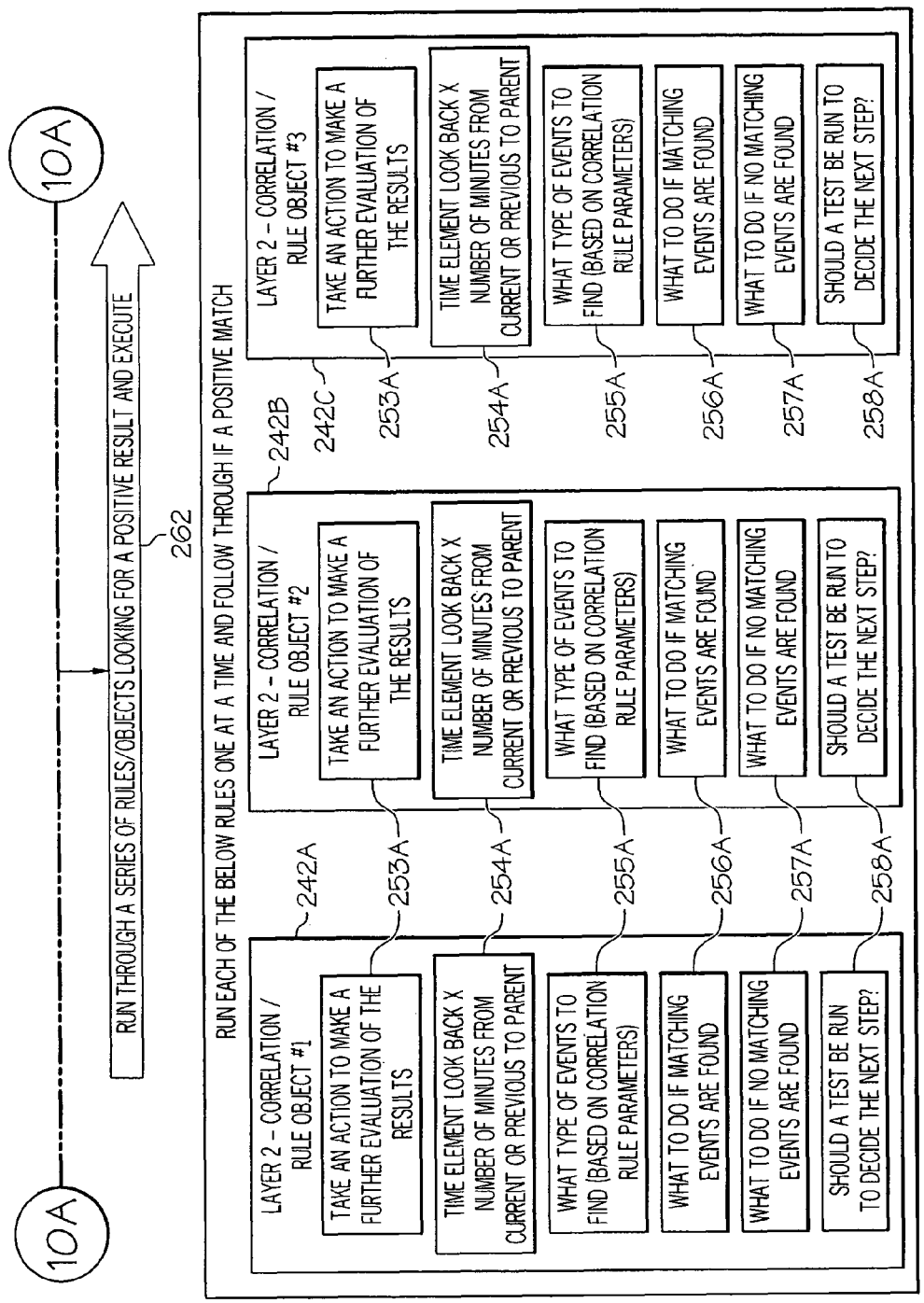

FIG. 10 is a flow diagram illustrating the components of a node including a rule and an action in accordance with the present invention. In this example, root node 240 includes time frame criteria 244A, rule criteria 245A, and automation criteria 246A, 247A, and 248A. The time frame criteria 244A permit a user to define a time period in which to search for events that match the rule criteria. The rule criteria 245A contain a definition for correlation of events, as described above. Additional logic 264 is provided for the rule criteria for example containing Boolean logic, (with the option for embedded regular expressions) and same and different value matching 245B, as described above. Automation criteria 246A associated with the node permit a user to define what to do if matching events are found, for example if the match is a success. Additional logic 246B associated with this criterion can, for example, include that an action can be taken, notification sent and severity assigned. In addition, the automation criteria allow a user to define what to do if no matching events are found at this layer or at a child layer 247A. Additional logic associated with this criterion allows for the user to select whether action can be taken, notification sent and severity assigned 247B. In addition, a user can define whether a test needs to be run to decide the next step to be taken in the correlation 248A. Additional logic associated with this criterion includes whether a pause should be included to wait for results before proceeding 248B. The Additional Logic element 264 of FIG. 10 contains additional logic that is to be performed based on the results of elements 244A, 245A, 246A, 247A, 248A. These actions found in the root node 240 based on a successful or unsuccessful match at the current node or at a child node.

As explained above, assuming that the correlation is a success, namely that events have been matched to the correlation parameters 260, the thread propagates to children nodes 242A, 242B, 242C at a second layer of the decision tree. The children nodes are processed in order of decreasing importance as indicated by arrow 262. The children nodes 242A, 242B, 242C include elements that are similar to the elements described above in connection with the root object 240. With reference to child node 242A, the node can decide whether to take action to further evaluate results 253A. Time frame criteria can be set 254A to examine events based on a new, independent time frame or optionally a time frame that is related to the parent time frame as described above. In addition, elements 255A, 256A, 257A, and 258A are included related respectively to elements 245A, 246A, 247A, and 248A of the root node 240, as described above.

Figure 11A:
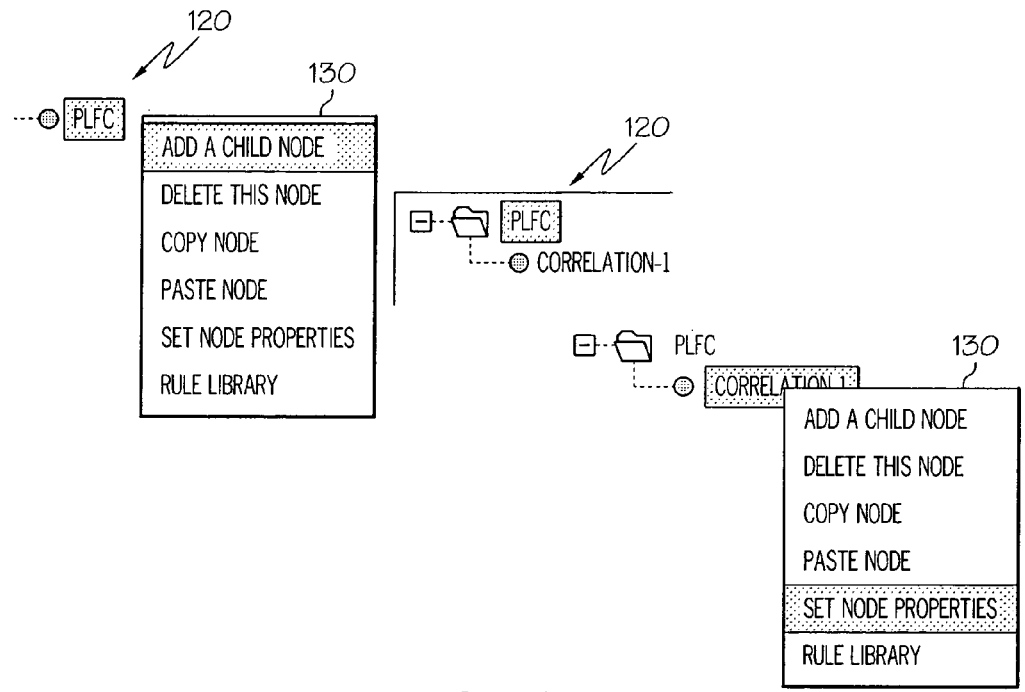
FIGS. 11A and 11B are screen printouts of an operation for generating and defining a newly added node in accordance with the present invention.
Figure 11B:
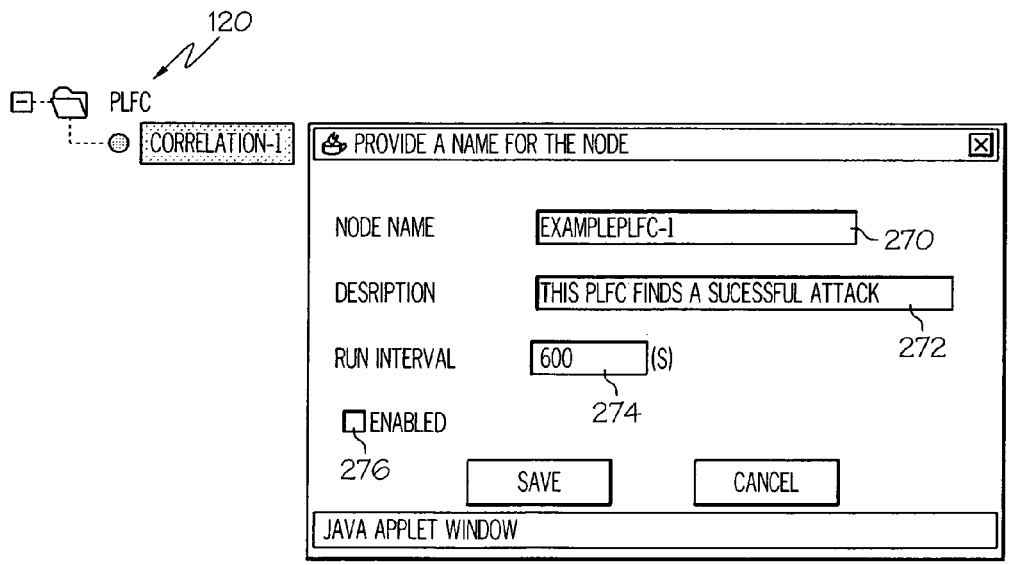

FIGS. 11A and 11B are screen printouts of an operation for generating and defining a newly added node in accordance with the present invention. With reference to FIG. 11A it is desired to add a child node to the decision tree menu 120. The main Progressive Layer Forensic Correlation (POSC) is highlighted, and with a right-click of the mouse button, "Add a Child Node" is selected in the pop-up window 130. As a default, the newly added node is entitled "Correlation-1". By highlighting the Correlation-1 node, and right-clicking on the highlighted node name, a user can further define the node properties by selecting "Set Node Properties" in the pop-up menu 130. With reference to FIG. 11B, a "node properties" window appears, and the node name is edited at entry field 270. A node description can be provided by the user at entry field 272. As the root node of this newly defined correlation, the node properties window further prompts the user for a run interval at entry field 274. The interval is specified by the user as the period at which the correlation is run. In this example, the defined correlation is set to run every 600 seconds, or ten minutes. Entry field 276 is a field at which the user designates whether the correlation is enabled or disabled.

Figure 12:
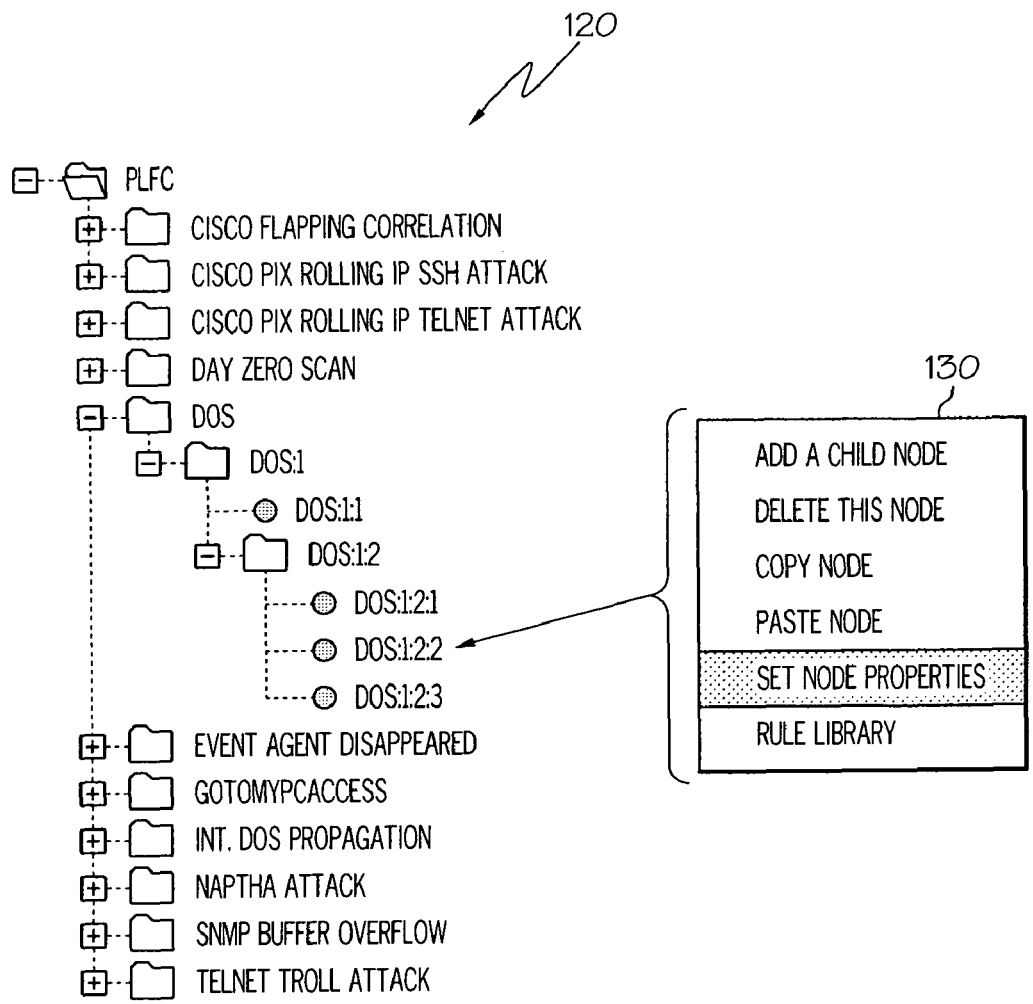
FIG. 12 is a screen printout of a decision tree menu illustrating the operation of setting node properties in accordance with the present invention.

FIG. 12 is a screen printout of a decision tree menu illustrating the operation of setting node properties in accordance with the present invention. As described above, the decision tree menu 120 includes a plurality of correlations, and each correlation can be expanded to display the corresponding decision tree. In this example, the correlation Denial of Service (DoS) is expanded. The decision tree menu 120 further defines the thread of each correlation. In this example, root node DoS:1 is located on the root layer. Child nodes DoS:1:1 and DoS:1:2 are assigned as children to the DoS:1 root node on a second layer of the decision tree. Child nodes DoS:1:2:1, DoS:1:2:2, and DoS:1:2:3, on the third layer, are assigned as child nodes to the DoS:1:2 node.

In the decision tree menu, the ordering of the thread proceeds from layer to layer and from sibling child node to sibling child node within a layer. For example, for the DoS correlation, process flow is initiated at the root node DoS:1. Assuming a successful rule correlation, the flow proceeds to the first child node of the second layer, DoS:1:1, as that node has highest priority on the second layer in this example. Assuming an unsuccessful rule correlation at the DoS:1:1 node, the thread proceeds to the DoS:1:2 node. Assuming a successful rule correlation at the DoS:1:2 node, process flow proceeds to child node DoS:1:2:1 at the third layer, then to DoS:1:2:2, and DoS:1:2:3, in that order. In this manner, the relative order of the nodes as placed on the decision tree defines the thread of the correlation. If it is determined that a node on a particular layer is of higher importance than another node on a particular layer, that node can be selected and moved to a higher position in the order. Upon moving the node, the node is assigned a new node identifier that is in sequence with other node identifiers. As described above, upon selecting any node on the decision tree menu 120, the node can be highlighted and by right-clicking on the node, pop-up menu 130 appears. In this example the node properties are to be set and so that choice is selected.

Figure 13:
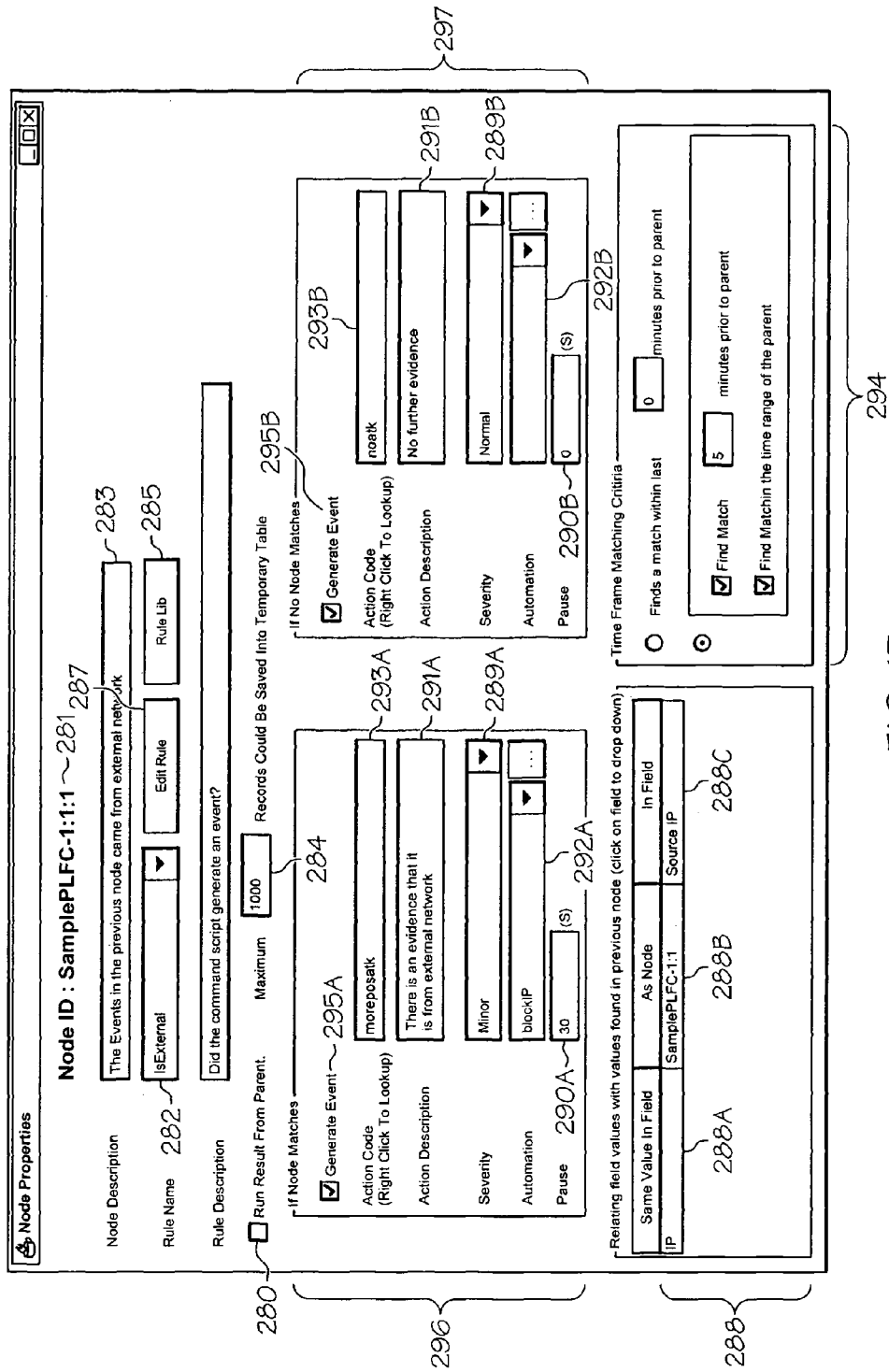
FIG. 13 is a screen printout of a window for entering properties that define a node in accordance with the present invention.

FIG. 13 is a screen printout of a window for entering properties that define a node in accordance with the present invention. The "node properties" window includes the node identifier 281, which is the same identifier used in the decision tree menu 120 as shown in FIG. 12 above. A description of the node is provided at entry field 283. A rule is applied to the node at entry field 282, which includes a pull-down selection menu. The rule can be edited by selecting box 287 and the rule library can be accessed by selecting box 285. Entry window 280, if selected, designates that the present node will run the applied correlation against the match results from the parent of the present node, and using the timeframe of the parent node. Entry window 284 designates the maximum number of records that can be saved in a temporary table to be associated with the present node, assuming the match results from the parent are designated at entry window 280. This designation can be helpful where the match results of the parent, results in a large number of matching events, and this option can help to improve process throughput by only saving a specified quantity in the temporary table of the present node.

When field entry box 280 is selected, the current node rule will only execute the correlation using the results previously obtained in the parent node. This has an overall effect of keeping the speed of the system faster by not always querying on the entire repository, instead querying on what has already been matched in this decision tree in the previous parent. Box 284 limits the number of records to save in the temporary table, again increasing the speed of the system because some correlation matches could yield hundreds of thousands or millions of records all of which might not be needed to decide there is an anomaly.

Field 296 of the node properties window designates the types of automations and actions to be taken in the event that the correlation associated with the present node results in a match. Field 297 of the node properties window designates the types of automations and actions to be taken in the event that none of the child nodes that are children to the present node result in a successful correlation. In field 296, entry field 295A, when checked, indicates that an event is to be generated when the correlation performed by the present node results in a success. The event to be generated is defined as an action code 293A and a description is provided in field 291A. A severity designation for the event can also be applied at field 289A. A generated event can appear on the alert monitor and on an event summary table to indicate to a user that an abnormality has occurred. The event summary table, in one example, comprises a consolidated de-duplicated event listing that is more convenient for review by a user than the main event repository. An automation related to the event can also be selected at field 292A. In general, automations are capable of performing external functions related to the event, for example notifying other individuals or systems by e-mail or other electronic protocol, escalating the severity of an event, launching additional command scripts, and the like. If an automation is selected as an option, upon its initiation, a pause period may be defined at entry field 290A. The pause period pauses the correlation thread for a defined period of time to allow the automation adequate time to be processed before continuing, since it is possible that other nodes in the correlation may depend up the result of the designated automation.

Field 297 of the node properties window designates whether events are to be generated and automations processed in the case where none of the child nodes that are children of the present node result in a successful correlation. As in the case of field 296, entry window 295B designates whether an event is to be generated. The action code and action description of the event are designated at fields 293B, 291B. A severity level for the generated event can be designated at 289B. In addition, an automation can be initiated 292B and a pause period 290B assigned, as described above.

Field 288, referred to as the "relation criteria" field of the node properties window permits a user to further correlate the results of the rule of the present node with values found in an ancestor node, for example a parent, grandparent or other ancestor node in the decision tree. The "Same Value in Field" designation 288A refers to a field of the correlation performed by the present node. The "As Node" designation 288B refers to an ancestor node to the present node. The "In Field" designation 288C refers to the field value of the correlation results of the ancestor node. In this manner, the values of a field for any events that match as a result of the rule of the present node can be further matched against the results of ancestor nodes, to thereby further define the correlation performed by the present node. If this option is selected, a successful correlation for the present node is defined as one that resulted in a match under the defined rule 282 and as a match under the defined relation 288. If the rule criteria 282 results in a match and the relation criteria 288 does not result in a match, then the correlation of the present node is designated as unsuccessful. The relation criteria field 258 is described in further detail below, in connection with FIGS. 14-16.

Figure 17:
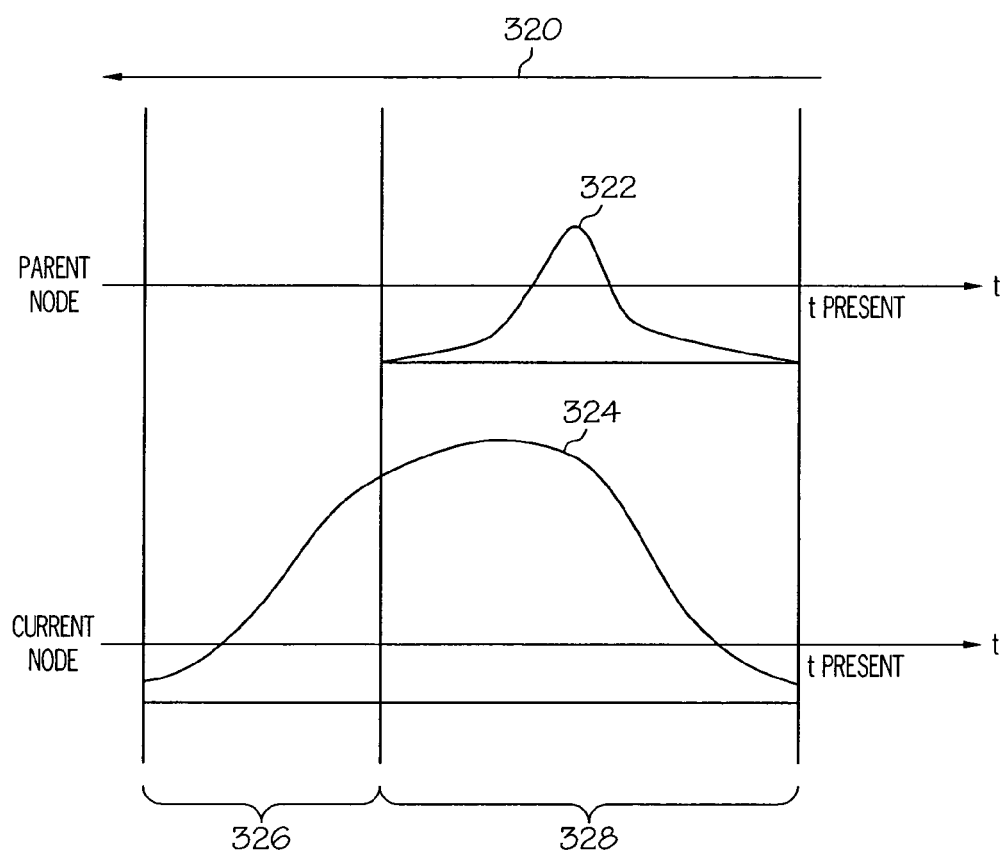
FIG. 17 is a graphical illustration indicating the options of defining a time window independent of the time defined in a parent node, and defining a time window as a function of a time window defined in a parent node, in accordance with the present invention.

Field 294 of the node properties window permits designation of time frame matching criteria for the present correlation. This option allows a user to set a time period for the present correlation in which to search for events. In one option, the time period is defined based on a defined period prior to the present time. In another option, the time period is defined as the time range designated in the parent node to the present node. In another option, the time period is defined as an additional amount of time prior to the time period defined in the parent node to the present node. With reference to FIG. 17, graph 322 indicates the number of events that resulted in a match for the time period defined in the parent node. Graph 324 indicates the number of events that resulted in a match for the present node. It can be seen that the present correlation captured an additional number of events 326 by designating an additional time period by going back in time beyond the parent time period. The current node could include more events during the parent time based on whether the rule was only running the results of the parent (see selection field 280 of FIG. 13) or whether it was looking for something totally different.

Figure 14:
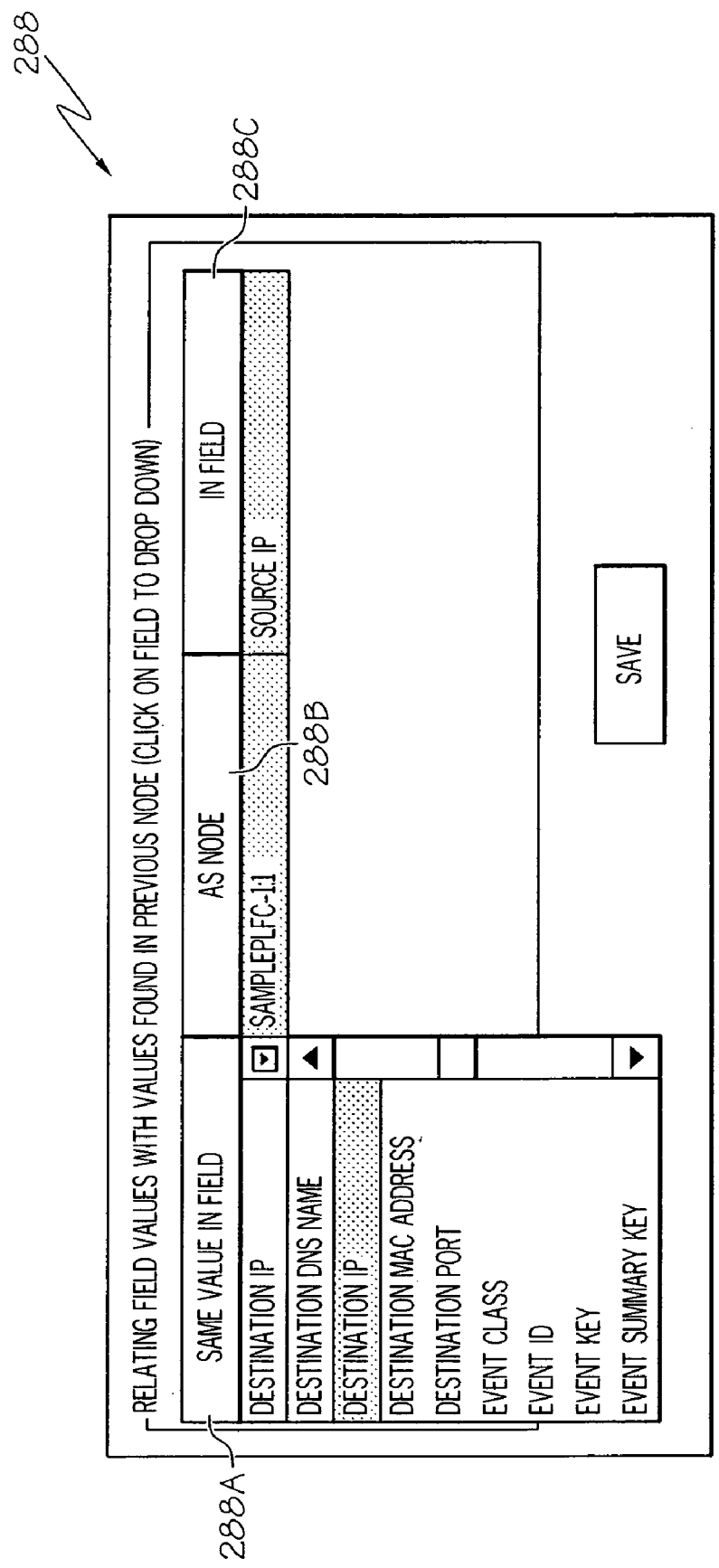
FIGS. 14-16 are screen printouts of a field for designating an ancestral node relation, in accordance with the present invention.
Figure 15:
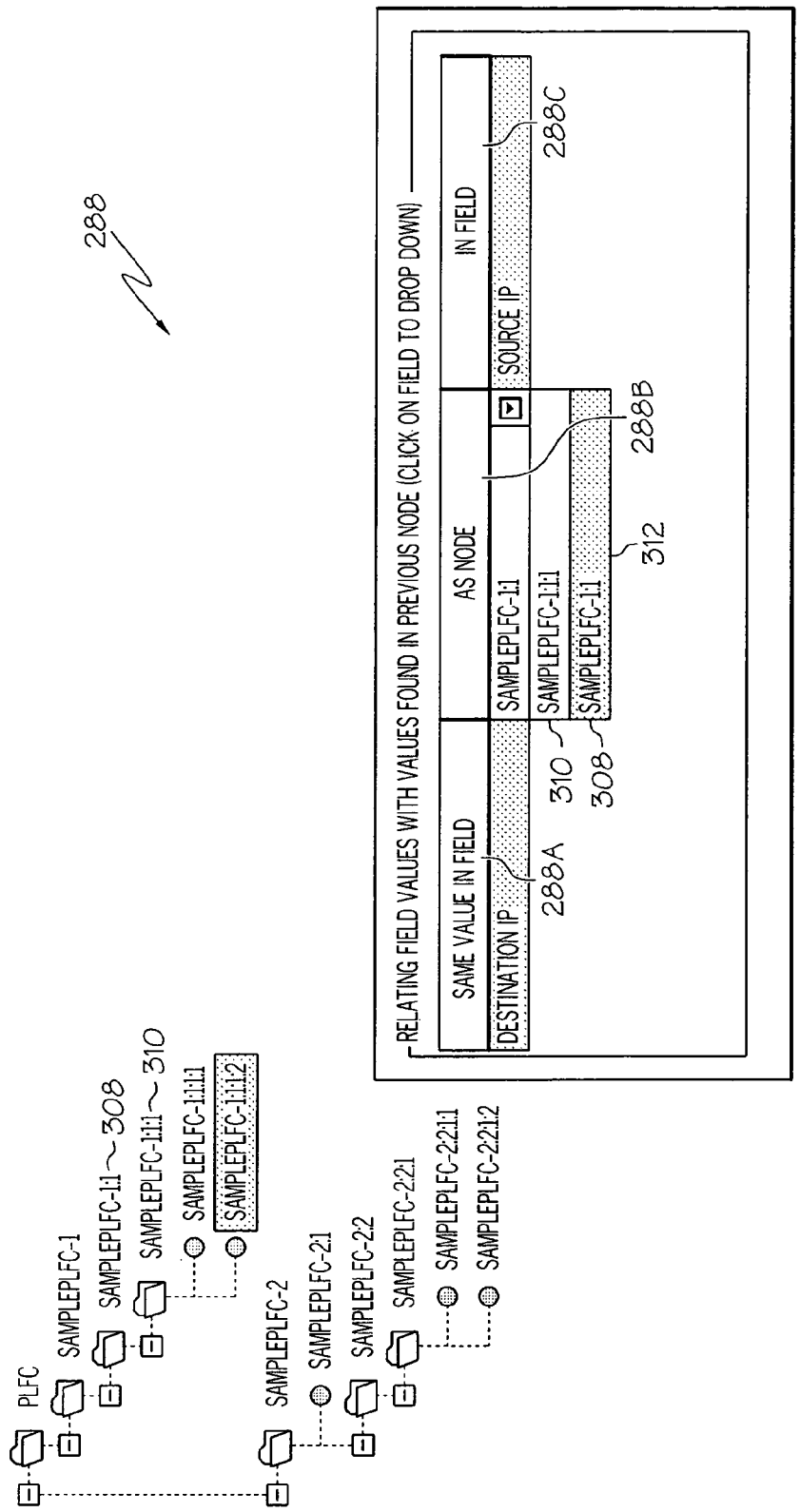
Figure 16:
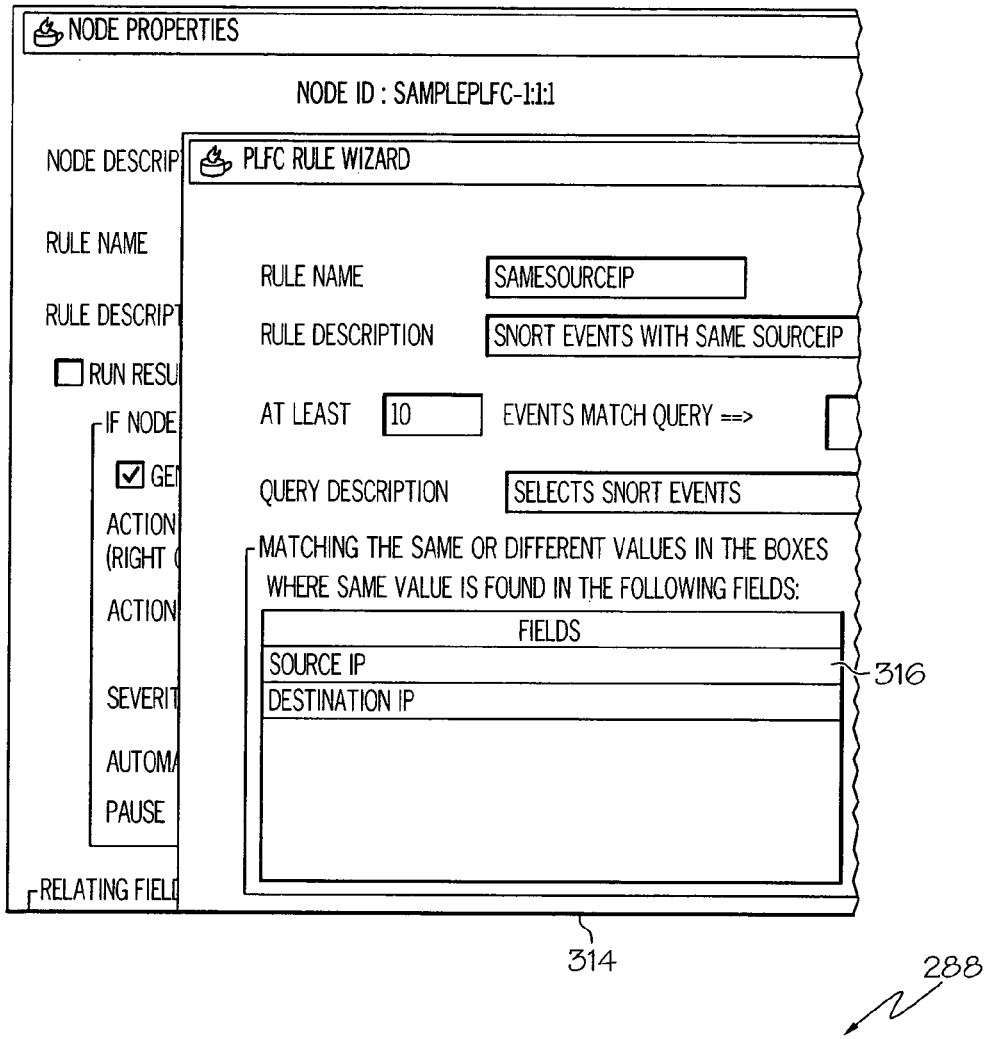

FIGS. 14-16 are screen printouts of a field for designating an ancestral node relation, in accordance with the present invention. FIGS. 14, 15, and 16 illustrate examples of designations of the various options in the relation field 288 of the node properties window of FIG. 13. In FIG. 14, the "Same Value in Field" option is selected from a listing of pre-defined event fields. In this case, the Destination IP field is selected. Referring to FIG. 15, the ancestor node 288B is selected (Node 1:1). In this example, the present node is sample PLFC-1:1:1:2. Therefore in the pull-down menu of the ancestor node option 288B, the only nodes available for selection are the parent node 310 and grandparent node 308. With reference to FIG. 16, the field values of the ancestor node 288C are selected among those field values defined in the rule definition entry window (see FIG. 7 above). In this example, the rule definition entry window designates that events having a Source IP or Destination IP that match are considered matching events. Therefore the only fields available in the field value of the ancestor column 288C are likewise Source IP and Destination IP.

Figure 18:
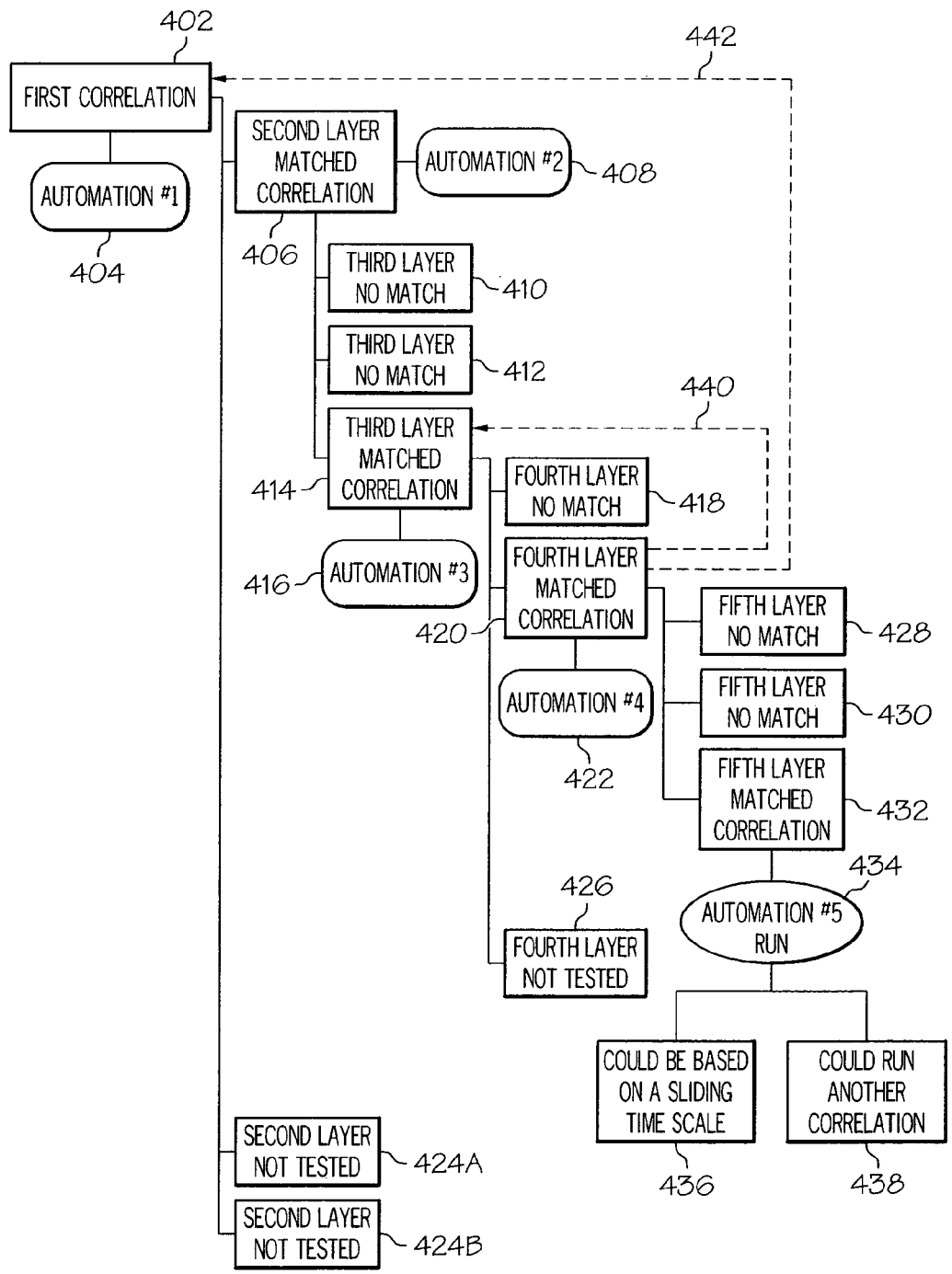
FIG. 18 is a flow diagram that provides another example of system progression through a decision tree in accordance with the present invention.

FIG. 18 is a flow diagram that provides another example of system progression through a decision tree in accordance with the present invention. In this example, a first correlation is performed at root node 402. Assuming a positive correlation result, a first automation 404 is initiated. The correlation thread next progresses to the first node 406 of the second layer of nodes. Assuming a successful correlation result at node 406, a second automation is initiated 408. The thread then progresses to a first node 410 of a third layer which is a child node of node 406 of the second layer. Assuming that the correlation at node 410 is unsuccessful, the thread progresses to the second node 412 of the third layer. Assuming that the correlation of the second node of the third layer 412 is unsuccessful, the thread progresses to the third node 414 of the third layer. Assuming a successful correlation result at node 414, a third automation 416 is performed. The thread then progresses to the first node 418 of a fourth layer of the decision tree. Assuming that a correlation at node 418 is unsuccessful, the thread next progresses to a second node 420 of the fourth layer. Assuming that a correlation at node 420 is successful a fourth automation 422 is performed and the thread progresses to a first node 428 of a fifth layer of the decision tree. Assuming that the correlation at node 428 is unsuccessful, the thread progresses to a second node 430 of the fifth layer. Assuming that a correlation at node 430 is unsuccessful, the thread progresses to a third node 432 of the fifth layer. Assuming a successful correlation at node 432, a fifth automation 434 is initiated. In one example, the fifth automation is run in response to a correlation at node 432 that is based on a sliding time scale (see FIG. 17 above). In another example, the fifth automation, when run, can be configured to initiate another correlation, for example initiating a correlation to be performed by another branch of the decision tree, for example using a script or command to initiate a new correlation.

Because the first node 406 of the second layer produced a successful correlation result, the thread of the correlation did not pass through lower-priority nodes of the second layer 424A, 424B. Similarly, because the second node 420 of the fourth layer produced a successful correlation result, the thread of the correlation did not pass through lower-priority node 426 of the fourth layer.

As explained above, any lower-layer node can access the results of a correlation performed by a higher-layer node. For example, node 420 can include a correlation that accesses the results of the correlation performed at parent node 414, as indicated by dashed line 440, or, can optionally access the correlation results of higher-layer ancestor nodes, including the results of the correlation performed by the root node of the decision tree 402, as indicated by dashed line 442.

Figure 19:
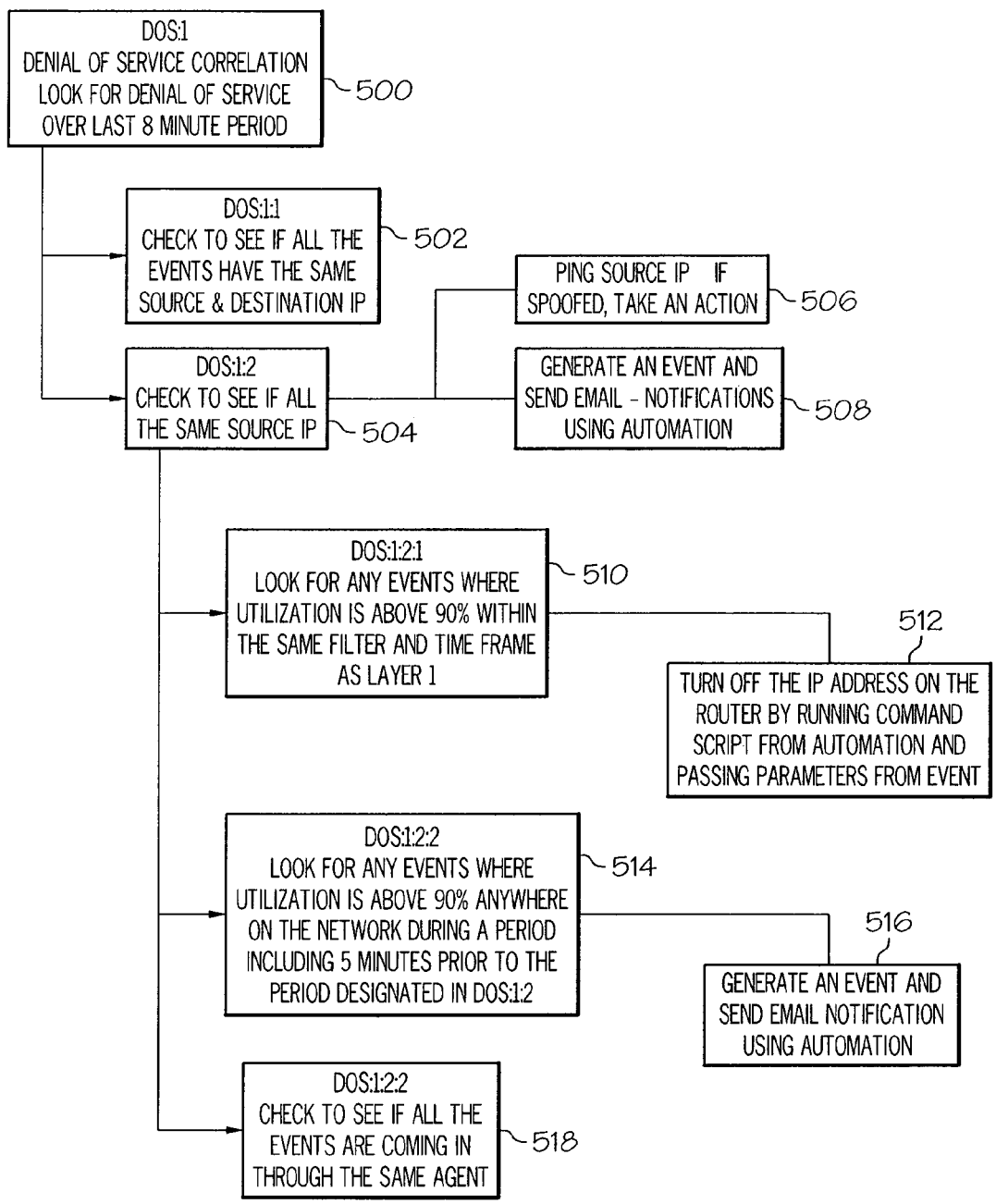
FIG. 19 is a flow diagram indicating the progression of system flow through a decision tree for a denial of service (DoS) correlation, in accordance with the present invention.

FIG. 19 is a flow diagram indicating the progression of system flow through a decision tree for a denial of service (DoS) correlation, in accordance with the present invention. In this example, the rule of the root node 500 searches for Denial of Service (DoS) events that have occurred over a prior eight minute period. A first node 502 of a second layer of the correlation performs a correlation to determine if all of the events matching the rule of the correlation performed at node 500 have the same Source IP and Destination IP address. In this example, the correlation was unsuccessful so the thread progresses to a second node 504 of the second layer. At node 504, a correlation is performed to determine if all of the events matching the criteria of the rule of node 500 have the same Source IP address, where some may have a different Destination IP address. Assuming a successful correlation, an event is generated to ping the Source IP to determine whether it might be spoofed 506. In addition, an automation process is used to generate an e-mail message and to provide notifications to various interested parties 508. Assuming the correlation performed at node 504 results in a success, the thread progresses to a first node 510 of a third layer of the decision tree. At node 510, a correlation is performed to locate events indicating that utilization is above 90%, using the same results and time frame as that designated at ancestor node 500. Assuming the correlation performed at node 510 results in a success, an automation is performed by running a command script that disables the Source IP address at the router 512. Assuming the correlation at node 510 led to an unsuccessful result, the thread of the decision tree passes to a second node 514 of the third layer. A correlation is performed at node 514 to determine whether events have occurred where utilization is above 90% anywhere on the network during a time period including five minutes prior to the time period designated in the correlation of node 504. Assuming the correlation at node 514 has a successful result, an event is generated and e-mail notification is sent to appropriate parties using an automation 516. Assuming the correlation at node 514 produces an unsuccessful result, the thread progresses to a third node 518 on the third layer. At this node, a correlation is performed to determine whether all events determined to have the same Source IP at the correlation of node 504, are received over the network via the same agent. The layered and hierarchical correlation defined above is merely an example of an application of the features of systems and methods of the present invention, and can be expanded and enhanced in accordance with user requirements.

Figure 20:
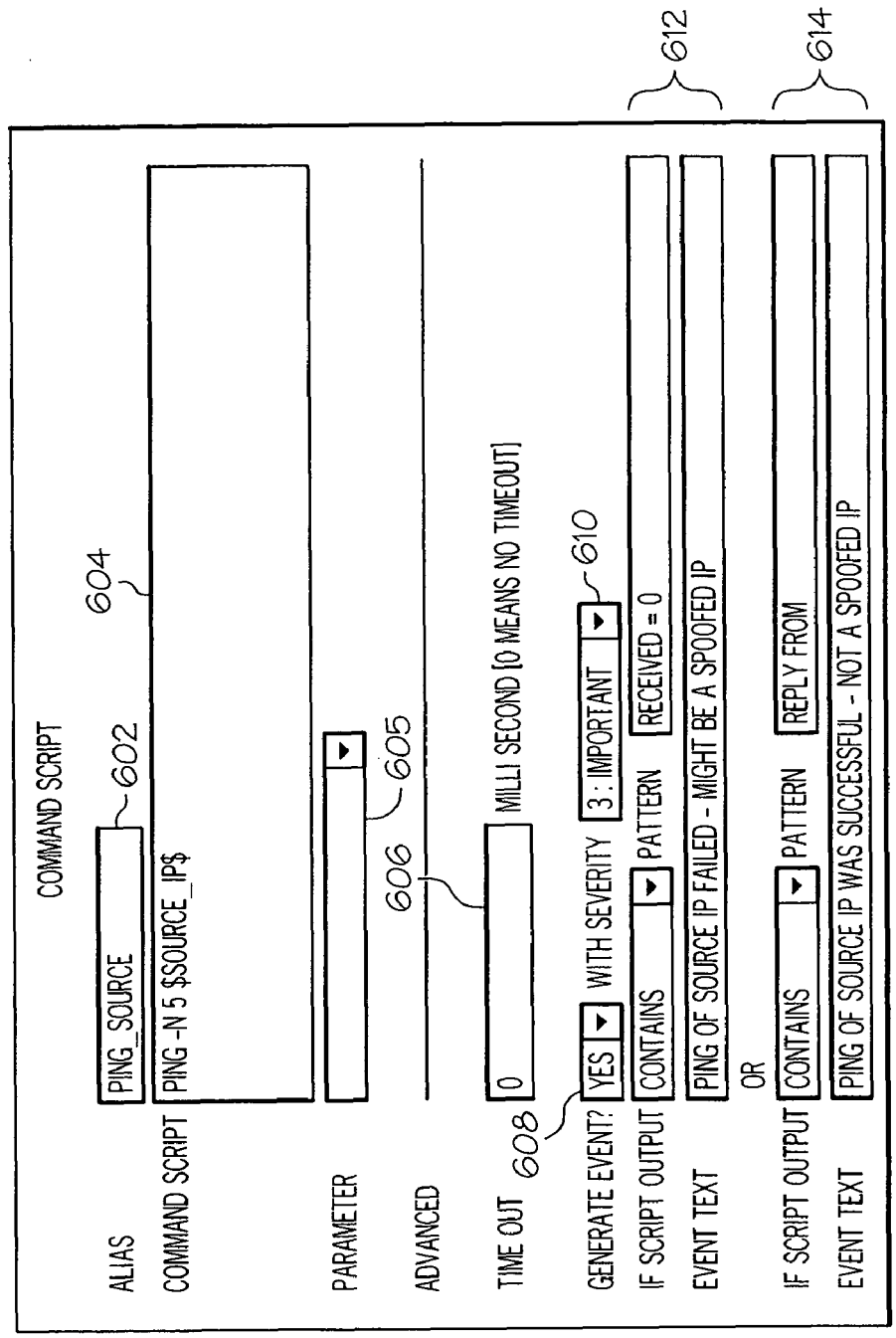
FIG. 20 is a screen printout of an entry window for configuring an automation command script that generates an event in response to an output of the command script, in accordance with the present invention.

FIG. 20 is a screen printout of an entry window for configuring an automation command script that generates an event in response to an output of the command script, in accordance with the present invention. The command script includes an alias or name 602 that is a reference to the actual script, shown in entry field 604. The parameter field is a pull-down menu of all of the field names that can be automatically added to the command script, so that memorization of field names is not required. When an event is generated by a node, the associated automation (see entry field 292A of FIG. 13, for example) can optionally initiate a command script. The command script is run on, or from, the host system and a script output is generated. The results of the command script are captured the system. As a result of running the command script, as part of the automation, an event can be generated by designating such at entry field 608. A severity for the event can also be designated at entry field 610. With reference to entry field 612 and 614, the script output can optionally be examined for certain parameters, results, or textual strings. In response to the script output containing a specified pattern, event text can be generated for the event as specified in the related entry field. As a result, an event is added to the general event summary which, as described above, is available to any node in the present decision tree, or other decision trees that share the same event summary for the system. The event created contains that is was a script, the results and the fields being matched to get the results. The very next node in the decision tree (or other node) can search for this event, based on knowing the previous field values from previous successful ancestors on that decision tree.

In this manner, a system and method are provided for correlating system events in an intuitive and modular fashion. Rules are arranged as nodes among layers of a hierarchical decision tree. Nodes of the decision tree can be copied and re-used at other locations on the current tree, or on another tree, in a highly efficient manner. When this occurs, corresponding field values from a parent or ancestor node are automatically updated in the newly introduced node. In addition, when a decision tree is used to operate on an event repository, the results of various rules, defined as a "match" or "no match", are stored in a common event table that is accessible by nodes at other layers of the decision tree. In this manner, the investigation performed by the decision tree is progressive in the sense that the correlation results of nodes of higher layers of the decision tree can be utilized by correlation nodes of lower layers, allowing the information extracted by the decision tree to build progressively. In addition, the systems and methods of the present invention allow for the initiation of actions, for example command scripts, at designated nodes of the decision tree, for example upon the occurrence of certain conditions. In this manner, an efficient and intuitive system and method are provided for building, operating and maintaining a dynamic event correlation decision tree, for reliable forensic analysis of system events, on a real-time basis.

While this invention has been particularly shown and described with references to preferred embodiments thereof, it will be understood by those skilled in the art that various changes in form and details may be made herein without departing from the spirit and scope of the invention as defined by the appended claims.

For example, the systems and methods of the present invention are compatible with present and future event management system suited for distributed or closed networks. An executable object comprising the systems and methods of the present may be located on one or more host computers located on a network, and may be stored on one or more hard drive media, or portable media such as optical media. The executable object may likewise be configured to operate on one or more of the host computers on the network, and, when executing, can access events generated by any of a number of devices on the network.

What is claimed is:

1. A method for forensic analysis of events in an event listing comprising:

a security device arranging a plurality of correlation objects in a hierarchical decision tree having multiple layers, each correlation object including a correlation rule that defines a correlation that is to be performed by the correlation object, at least one of the layers having parent correlation objects to which children correlation objects are assigned;

the security device applying the decision tree to the event listing to perform a forensic analysis in an order of correlation objects that is defined by a correlation thread, the correlation thread initiating a correlation by one of the parent correlation objects which results in one of a success or failure, wherein said applying the decision tree to the event listing to perform the forensic analysis comprises the security device evaluating the event listing against the correlation rules of the correlation objects in the order defined by the correlation thread;

in the event of a success of the parent correlation object, the security device storing results of evaluating the correlation rule of the parent correlation object against the event listing in a parent event listing corresponding to the parent correlation object, the parent event listing comprising a subset of events of the event listing, and initiating, by the correlation thread, evaluating the parent event listing against the correlation rule of one of the child correlation objects assigned to the successful parent correlation object; and in the event of a failure of the evaluating performed by the parent correlation object, the correlation thread initiates evaluating of the event listing against a correlation rule of another parent correlation object, wherein the parent correlation object defines a time frame of the event listing from which events can be drawn for the correlation, wherein a second time frame corresponding to the child correlation object is calculated relative to the time frame defined by the parent correlation object.

2. The method of claim 1 wherein the events comprise at least one of network events and security-related events.

3. The method of claim 1 wherein the event listing comprises one of a main event listing and a summary event listing containing de-duplicated events of the main event listing.

4. The method of claim 1 wherein the correlation thread begins with higher-level correlation objects and continues to lower-level correlation objects.

5. The method of claim 1 wherein the correlation thread initiates correlations by correlation objects on a same level of a decision tree in order of importance of the correlation objects sharing the same level.

6. The method of claim 1 wherein a child correlation object further accesses a parent event listing corresponding to an ancestor correlation object of the parent correlation object for performing the correlation.

7. The method of claim 1, wherein, in the event of a failure of the correlation performed by the child correlation object, the correlation thread initiates a correlation by another sibling child correlation object that is assigned to the successful parent correlation object.

8. The method of claim 1 wherein, in the event of a success of the child correlation object, results of the correlation performed by the child correlation object are stored in a child event listing corresponding to the child correlation object, the child event listing comprising a subset of events of the event listing, and the correlation thread initiating a correlation by descendant child correlation objects assigned to the successful child correlation object, the descendant child correlation object accessing the child event listing for performing the correlation.

9. The method of claim 1 wherein a success of a correlation is based on whether events match a rule query defined for a correlation object performing the correlation.

10. The method of claim 9 wherein a success of a correlation is further based on whether fields of events of the correlation performed on the correlation object match.

11. The method of claim 9 wherein a success of a correlation is further based on whether fields of events of the correlation performed on the correlation object do not match.

12. The method of claim 9 wherein a success of the correlation of the correlation object is further based on whether a value of a field of events matching the rule query match fields of events stored in an event listing of an ancestor object.

13. The method of claim 1 further comprising the object performing the correlation generating an event as a result of one of a success or a failure of the correlation, and storing the event in the event listing for access by other correlation objects in decision trees having access to the event listing.

14. The method of claim 1 further comprising initiating an automation as a result of one of a success or failure of the correlation, the automation initiating an activity of the system.

15. The method of claim 14 wherein the automation comprises performing a command script.

16. The method of claim 15 further comprising analyzing results produced by the command script, generating an event as a result of the analysis, and storing the event in the event listing for access by other correlation objects in the decision tree.

17. The method of claim 14 further comprising initiating a pause period upon initiating the automation, the pause period pausing the system to ensure completion of the automation before the correlation thread continues.

18. The method of claim 1 wherein arranging a plurality of correlation objects in a hierarchical decision tree further comprises copying a correlation object from a first location on the decision tree to a second location.

19. The method of claim 18 wherein the correlation thread of the copied correlation object is automatically adjusted to correspond with the second position.

20. The method of claim 18 wherein children and any other descendant correlation objects of the copied correlation object are further copied and automatically adjusted to correspond with the second position of the copied correlation object.

21. A system for forensic analysis of events in an event listing comprising:
a hardware processor;
a computer-readable medium carrying at least one sequence of instructions, wherein execution of the sequence of instructions by the system causes the system to:
arrange a plurality of correlation objects in a hierarchical decision tree having multiple layers, each correlation object including a correlation rule that defines a correlation that is to be performed by the correlation object, at least one of the layers having parent correlation objects to which children correlation objects are assigned;
apply the decision tree to the event listing to perform a forensic analysis in an order of correlation objects that is defined by a correlation thread, the correlation thread initiating a correlation by one of the parent correlation objects which results in
one of a success or failure, wherein said causing the system to apply the decision tree to the event listing to perform the forensic analysis comprises causing the system to evaluate the event listing against the correlation rules of the correlation objects in the order defined by the correlation thread; and in the event of a success of the parent correlation object, store results of the evaluating the correlation rule of the parent correlation object against the event listing in a parent event listing corresponding to the parent correlation object, the parent event listing comprising a subset of events of the event listing, and initiating, by the correlation thread, an evaluation of the parent event listing against the correlation rule of one of the child correlation objects assigned to the successful parent correlation object; and in the event of a failure of the correlation performed by \the parent correlation object, the correlation thread initiates evaluation of the event listing against a correlation rule of another parent correlation object, wherein the parent correlation object defines a time frame of the event listing from which events can be drawn for the correlation, wherein a second time frame corresponding to the child correlation object is calculated relative to the time frame defined by the parent correlation object.

22. The system of claim 21 wherein the events comprise at least one of network events and security-related events.

23. The system of claim 21 wherein the event listing comprises one of a main event listing and a summary event listing containing de-duplicated events of the main event listing.

24. The system of claim 21 wherein the correlation thread begins with higher-level correlation objects and continues to lower-level correlation objects.

25. The system of claim 21 wherein the correlation thread initiates correlations by correlation objects on a same level of a decision tree in order of importance of the correlation objects sharing the same level.

26. The system of claim 21 wherein a child correlation object further accesses a parent event listing corresponding to an ancestor correlation object of the parent correlation object for performing the correlation.

27. The system of claim 21, wherein, in the event of a failure of the correlation performed by the child correlation object, the correlation thread initiates a correlation by another sibling child correlation object that is assigned to the successful parent correlation object.

28. The system of claim 21 wherein, in the event of a success of the child correlation object, results of the correlation performed by the child correlation object are stored in a child event listing corresponding to the child correlation object, the child event listing comprising a subset of events of the event listing, and the correlation thread initiating a correlation by descendant child correlation objects assigned to the successful child correlation object, the descendant child correlation object accessing the child event listing for performing the correlation.

29. The system of claim 21 wherein a success of a correlation is based on whether events match a rule query defined for a correlation object performing the correlation.

30. The system of claim 29 wherein a success of a correlation is further based on whether fields of events of the correlation performed on the correlation object match.

31. The system of claim 29 wherein a success of a correlation is further based on whether fields of events of the correlation performed on the correlation object do not match.

32. The system of claim 29 wherein a success of the correlation of the correlation object is further based on whether a value of a field of events matching the rule query match fields of events stored in an event listing of an ancestor object.

33. The system of claim 21 wherein the correlation object further performs the correlation generating an event as a result of one of a success or a failure of the correlation, and storing the event in the event listing for access by other correlation objects in the decision tree.

34. The system of claim 21 wherein an automation is initiated as a result of one of a success or failure of the correlation, the automation initiating an activity of the system.

35. The system of claim 34 wherein the automation comprises performing a command script.

36. The system of claim 35 wherein results produced by the command script are further analyzed, an event is generated as a result of the analysis, and the event is stored in the event listing for access by other correlation objects in decision trees having access to the event listing.

37. The system of claim 34 wherein a pause period is initiated upon initiating the automation, the pause period pausing the system to ensure completion of the automation before the correlation thread continues.

38. The system of claim 21 wherein a correlation object of the decision tree can be copied from a first location on the decision tree to a second location.

39. The system of claim 38 wherein the correlation thread of the copied correlation object is automatically adjusted to correspond with the second position.

40. The system of claim 38 wherein children and any other descendant correlation objects of the copied correlation object are further copied and automatically adjusted to correspond with the second position of the copied correlation object.

41. A computer-readable medium carrying at least one sequence of instructions for performing forensic analysis of events in an event listing, wherein the computer-readable medium comprises one of a hard drive medium and a portable optical medium and wherein execution of the sequence of instructions by at least one processor causes the at least one processor to perform the steps of:

arranging a plurality of correlation objects in a hierarchical decision tree having multiple layers, each correlation object including a correlation rule that defines a correlation that is to be performed by the correlation object, at least one of the layers having parent correlation objects to which children correlation objects are assigned;

applying the decision tree to the event listing to perform a forensic analysis in an order of correlation objects that is defined by a correlation thread, the correlation thread initiating a correlation by one of the parent correlation objects which results in one of a success or failure, wherein said applying the decision tree to the event listing to perform the forensic analysis comprises the security device evaluating the event listing against the correlation rules of the correlation objects in the order defined by the correlation thread; and in the event of a success of the parent correlation object, storing results of evaluating the event listing against the correlation rule of the parent correlation object in a parent event listing corresponding to the parent correlation object, the parent event listing comprising a subset of events of the event listing, and initiating, by the correlation thread, evaluating the parent event listing against the correlation rule of one of the child correlation objects assigned to the successful parent correlation object; and in the event of a failure of the evaluating performed by the parent correlation object, the correlation thread initiates evaluating of the event listing against a correlation rule of another parent correlation object, wherein the parent correlation object defines a time frame of the event listing from which events can be drawn for the correlation, wherein a second time frame corresponding to the child correlation object is calculated relative to the time frame defined by the parent correlation object.

\* \* \* \* \*